United States Patent
Eichhorn et al.

(10) Patent No.: US 7,226,057 B2
(45) Date of Patent: Jun. 5, 2007

(54) APPARATUS AND METHOD FOR AUTOMATICALLY LEVELING AN OBJECT

(75) Inventors: Mark M. Eichhorn, Granger, IN (US); James E. Rouch, Elkhart, IN (US); Alice E. Poseley, Elkhart, IN (US); James N. Sproatt, Elkhart, IN (US)

(73) Assignee: Days Corporation, Elkhart, IN (US)

( * ) Notice: Subject to any disclaimer, the term of this patent is extended or adjusted under 35 U.S.C. 154(b) by 333 days.

(21) Appl. No.: 10/843,128

(22) Filed: May 11, 2004

(65) Prior Publication Data

US 2004/0256815 A1 Dec. 23, 2004

Related U.S. Application Data

(63) Continuation-in-part of application No. 10/659,990, filed on Sep. 11, 2003, now Pat. No. 6,948,722, which is a continuation of application No. 09/522,545, filed on Mar. 10, 2000, now Pat. No. 6,619,693.

(51) Int. Cl.
*B60G 17/00* (2006.01)
(52) U.S. Cl. ................... 280/6.153; 280/6.154
(58) Field of Classification Search ............ 280/6.153, 280/6.154, 6.15, 5.514, 5.507
See application file for complete search history.

(56) References Cited

U.S. PATENT DOCUMENTS

| | | | |
|---|---|---|---|
| 3,857,582 A | 12/1974 | Hartog | |
| 4,061,309 A | 12/1977 | Hanser | |
| 4,103,869 A | 8/1978 | Mesny et al. | |
| 4,142,710 A | 3/1979 | Okuda | |
| 4,165,861 A | 8/1979 | Hanser | |
| 4,597,584 A | 7/1986 | Hanser | |
| 4,743,037 A | 5/1988 | Hanser | |
| 4,746,133 A | 5/1988 | Hanser et al. | |
| 4,783,089 A * | 11/1988 | Hamilton et al. | ........ 280/6.157 |
| 4,815,757 A | 3/1989 | Hamilton | |
| 4,913,458 A | 4/1990 | Hamilton | |
| 4,923,210 A * | 5/1990 | Heider et al. | ............ 280/6.153 |
| 5,143,386 A | 9/1992 | Uriarte | |
| 5,188,379 A | 2/1993 | Krause et al. | |

(Continued)

OTHER PUBLICATIONS

Advertisement; "Straight Truck Hydraulic Lift Systems" by Equalizer Systems.

(Continued)

*Primary Examiner*—Eric Culbreth
(74) *Attorney, Agent, or Firm*—Barnes & Thornburg LLP

(57) ABSTRACT

A method and apparatus for automatically leveling a vehicle is provided, employing air springs, a sensor and a controller. The air springs are each mounted to the vehicle, and each can be at least partially inflated to provide suspension for the vehicle. Each of the air springs can also level the vehicle when the vehicle is parked. The sensor is mounted to the vehicle to sense pitch and roll of the vehicle relative to a reference level plane. The sensor also produces an orientation signal representing the vehicle pitch and roll. In response to the signal, the controller may cause at least one of the air springs to either inflate to move the vehicle upwardly, or deflate to move the vehicle downwardly relative to a ground surface, until the orientation of the vehicle reaches the reference level plane within a tolerance.

16 Claims, 14 Drawing Sheets

U.S. PATENT DOCUMENTS

| | | | |
|---|---|---|---|
| 5,237,782 A | 8/1993 | Cooper | |
| 5,312,119 A | 5/1994 | Schneider et al. | |
| 5,580,095 A | 12/1996 | Fukumoto | |
| 5,676,385 A | 10/1997 | Schneider et al. | |
| 5,833,296 A | 11/1998 | Schneider | |
| 5,913,525 A | 6/1999 | Schneider et al. | |
| 6,050,573 A | 4/2000 | Kunz | |
| 6,098,996 A * | 8/2000 | Perlot | 280/6.153 |
| 6,200,806 B1 | 3/2001 | Thomson | |
| 6,584,385 B1 * | 6/2003 | Ford et al. | 701/36 |
| 7,066,474 B2 * | 6/2006 | Hiebert et al. | 280/6.153 |
| 2001/0003386 A1 * | 6/2001 | Stiller | 267/64.16 |
| 2005/0236781 A1 * | 10/2005 | Brookes et al. | 280/5.507 |

OTHER PUBLICATIONS

Advertisement; "Hydraulic Lift Systems Single Leg AM Series Systems for Fifth Wheel, Gooseneck and Towable Trailers" by Equalizer Systems.

Advertisement; "Equalizer El-Pac Power Lifting System" by Equalizer System.

Advertisement; "Single and Dual Leg CM Series Systems for Fifth Wheel, Gooseneck and Low Boy Trailers" by Equalizer Systems.

Office Action Summary, Application No. 10/659,990/Filing Date Jul. 21, 2004.

* cited by examiner

APPARATUS AND METHOD FOR AUTOMATICALLY LEVELING AN OBJECT

RELATED APPLICATIONS

The present application is a Continuation-in-Part of U.S. patent application Ser. No. 10/659,990, filed on Sep. 11, 2003 now U.S. Pat. No. 6,948,722, entitled Apparatus And Method For Automatically Leveling An Object, which is a Continuation of U.S. patent application Ser. No. 09/522,545, filed on Mar. 10, 2000, entitled Apparatus and Method for Automatically Leveling an Object, now U.S. Pat. No. 6,619,693, issued on Sep. 16, 2003.

TECHNICAL FIELD

The present disclosure relates to an apparatus and method for leveling a vehicle, and more particularly to leveling the vehicle using extendable legs or a pneumatic suspension system.

BACKGROUND AND SUMMARY

Vehicles, such as recreational vehicles, are often parked on uneven terrain at campsites, parks, or other similar locations. Consequently, the comfort of the occupants within the vehicle while eating, sleeping, etc., as well as the proper operation of some appliances, such as refrigeration units, may be adversely affected by an out-of-level orientation of the vehicle. Similarly, certain industrial devices may require a level orientation for proper operation and are therefore mounted on platforms that require leveling.

It is known to employ jacks, blocks, or other extendable legs to level a vehicle. Typically, these legs are movable between stowed and use positions. In the stowed position, the vehicle can travel without impedance from the legs. In the use position, the legs can incrementally raise portions of the vehicle in an attempt to level the same. These legs can typically be used on paved or unpaved terrain.

In the case of recreational vehicles which can be parked overnight at certain retail establishments (e.g., Wal-Mart), in contrast to a campground or park, such legs may not always be useful. While retail establishments may allow recreational vehicles to be parked in their parking lot, they may not allow the vehicle to employ its extendable legs for concern of damaging the lot's surface. Accordingly, an alternative leveling apparatus may be required.

The present disclosure is directed to an apparatus and method for automatically leveling a vehicle, such as a recreational vehicle, or platform when the vehicle or platform is stationary and located on uneven terrain or out-of-level surface. One illustrative embodiment includes leveling the vehicle using extendable legs that engage the ground surface. This embodiment can be used in campgrounds and parks. Another illustrative embodiment employs air springs, typically, although not exclusively, those used for suspension of the vehicle, to level the vehicle as well. This embodiment can be used in parking lots or other locations where the use of extendable legs is not permitted.

One illustrative embodiment of the present disclosure provides an apparatus for leveling a vehicle having an air suspension system which comprises an independently adjustable right front suspension assembly, left front suspension assembly, right rear suspension assembly, and left rear suspension assembly, which is mounted to the vehicle. The apparatus for leveling the vehicle comprises a sensor, a controller, and memory. The sensor is mounted to the vehicle to sense pitch and roll of the vehicle relative to a reference level plane. The sensor also produces an orientation signal representing the vehicle pitch and roll. The controller is coupled to the air suspension system and the sensor, wherein the controller, in response to an operator command, levels the vehicle relative to the reference level plane by sequentially actuating the suspension assemblies. The controller interprets the orientation signal to determine an end and a side of the vehicle which are below the reference level plane, then alternating between adjusting the end and the side upwardly by individually, sequentially, or in unison supplying air to the suspension systems at the end and sequentially supplying air to the suspension systems at the side. Each suspension system can be inflated for a first predetermined period of time during each upward adjustment. The controller includes memory for storing data corresponding to the reference level plane, and is configured to write data representing an orientation signal to the memory to replace the reference level plane data with orientation signal data.

The above and other illustrative embodiments may also comprise: a sensor providing an orientation signal to the controller indicating a change in the vehicle orientation when the vehicle is at rest; a controller interpreting an orientation signal after each adjustment to determine whether either an end or side of the vehicle has passed through a reference level plane; upon determining that one end or side of the vehicle has passed through a reference level plane, a controller alternates between adjusting the end or side downwardly by sequentially deflating the suspension assemblies at the one end or side for a second predetermined period of time which is less than the first predetermined period of time, and continuing to adjust the other end or side upwardly by sequentially inflating the suspension assemblies at the other end or side for the first predetermined period of time; a controller that changes the direction of adjustment of an end and side each time they pass through the reference level plane, as indicated by an orientation signal, and reduces the period of time for inflating or deflating suspension assemblies at the end and the side with each passing of the reference level plane; switches for individually actuating the suspension assemblies; a valve assembly for deflating and inflating at least one of the suspension assemblies; a valve assembly provided for each suspension assembly; air that can be selectively added to or exhausted from at least one of the suspension assemblies through the valve assembly; a controller that blocks the ability of at least one suspension assembly from providing suspension to the vehicle when the vehicle is at rest; a controller that initiates the leveling of the vehicle by inflating or deflating at least one of the suspension assemblies after its ability to provide suspension to the vehicle is blocked; and during leveling of the vehicle, air can be added to or subtracted from air already present in the suspension assemblies prior to leveling the vehicle.

Another illustrative embodiment of the present disclosure provides an apparatus for leveling a vehicle having four adjustable air springs mounted to a suspension system on the vehicle at each of the respective corners of the vehicle. Each spring is inflatable and deflatable. A sensor is mounted to the vehicle to sense the pitch and roll of the vehicle, and provide an orientation signal representing the vehicle pitch and roll. A controller is coupled to the springs and the sensor for responding to the vehicle orientation signal by inflating or deflating the springs to adjust the vehicle orientation so it approaches a reference level plane stored as data within the controller.

A method of leveling the vehicle is disclosed which illustratively comprises the steps of: blocking air suspension control to air springs; comparing the orientation signal produced by the sensor; determining a low end and a low side of the vehicle relative to the reference level plane; alternating between sequentially inflating at least one of the air springs at the low end of the vehicle for a first predetermined actuation period, sequentially inflating at least one of the air springs at the low side of the vehicle for a second predetermined actuation period which may be the same as the first predetermined actuation period, determining whether the low end of the vehicle has been moved through the reference level plane after each sequential inflation of the springs at the low end of the vehicle, reversing direction of adjustment of the springs at the low end of the vehicle each time the low end of the vehicle is moved through the reference level plane, reducing the first predetermined actuation period each time the direction of adjustment of the springs at the low end of the vehicle is reversed, determining whether the low side of the vehicle has been moved through the reference level plane after each sequential inflation of the springs at the low side of the vehicle, reversing the direction of adjustment of the springs at the low side of the vehicle each time the low side of the vehicle is moved through the reference level plane, reducing the second predetermined actuation period each time the direction of adjustment of the springs at the low side of the vehicle is reversed, comparing the first and second predetermined actuation period to a preset minimum actuation period and stopping the automatic leveling process when either the first or the second predetermined actuation period is less than the preset minimum actuation period.

The above and other illustrative embodiments may further comprise the steps of: further inflating each air spring until it lifts its respective corner of the vehicle sufficiently that the orientation signal indicates a change in vehicle orientation; stopping the automatic leveling process when the orientation signal represents a vehicle orientation which is within a specified tolerance of the reference level plane.

Another illustrative embodiment of the present disclosure provides an apparatus for automatically leveling a vehicle having four corners. The apparatus comprises adjustable air springs, a level sensor, a controller, and memory. One adjustable air spring is mounted to the vehicle adjacent the left front corner of the vehicle. A second adjustable air spring is mounted to the vehicle adjacent the right front corner of the vehicle. A third adjustable air spring is mounted to the vehicle adjacent the left rear corner of the vehicle. And a fourth adjustable air spring is mounted to the vehicle adjacent the right rear corner of the vehicle. The level sensor is mounted to the vehicle for sensing the pitch and roll orientation of the vehicle relative to horizontal. The level sensor outputs an orientation signal representing the pitch and roll of the vehicle. The controller is connected to the adjustable air springs and the level sensor. The controller also includes a memory for storing data representing a reference level plane and outputs coupled to the adjustable air springs for inflating and deflating the air springs. The controller compares the orientation signal to the reference level plane to determine whether the front or rear of the vehicle is above the reference level plane, and whether the left or right side of the vehicle is below the reference level plane. The controller, being responsive to an operator input to level the vehicle, alternates between sequential adjustments of the air springs at the front or rear of the vehicle which is above the reference level plane, and sequentially deflating at least one of the air springs at the left or right side of the vehicle which is above the reference level plane. The controller actuates each air spring for a first predetermined period of time during each adjustment until the orientation signal indicates that the front, rear, left side, or right side of the vehicle has passed through the reference level plane. Conversely, the controller inflates the air springs corresponding to the front, rear, left side, or right side of the vehicle which has passed through the reference level plane for a second predetermined period of time which is less than the first predetermined period of time.

Another illustrative embodiment of the present disclosure provides an apparatus for automatically leveling a vehicle. The apparatus comprises a plurality of air springs, a sensor, and a controller. The plurality of air springs are each mounted to the vehicle, and each are at least partially inflated to provide suspension to the vehicle. In addition, each of the air springs level the vehicle when the vehicle is parked. The sensor is mounted to the vehicle to sense pitch and roll of the vehicle relative to a reference level plane. The sensor also produces an orientation signal representing the vehicle pitch and roll. The controller is coupled to each of the air springs and the sensor, and monitors the orientation signal received from the sensor. In response to that signal, the controller causes at least one of the air springs to either inflate to move the vehicle upwardly, or deflate to move the vehicle downwardly relative to a ground surface until the orientation of the vehicle reaches the reference level plane within a tolerance.

The above and other illustrative embodiments may also comprise: a plurality of valve assemblies in air communication with the air springs; an air source providing air through the valve assemblies and into the air springs; a controller that blocks the ability of the air springs to provide suspension to the vehicle when the vehicle is at rest; a controller that initiates the leveling of the vehicle by inflating or deflating the air springs after their ability to provide suspension to the vehicle is blocked; and the air springs not being exhausted of air prior to the leveling process.

Additional features and advantages of the leveling apparatus and method will become apparent to those skilled in the art upon consideration of the following detailed description of the illustrated embodiment exemplifying the best mode of carrying out the leveling apparatus and method as presently perceived.

BRIEF DESCRIPTION OF DRAWINGS

The present disclosure will be described hereafter with reference to the attached drawings which are given as non-limiting examples only, in which.

Figure 1:
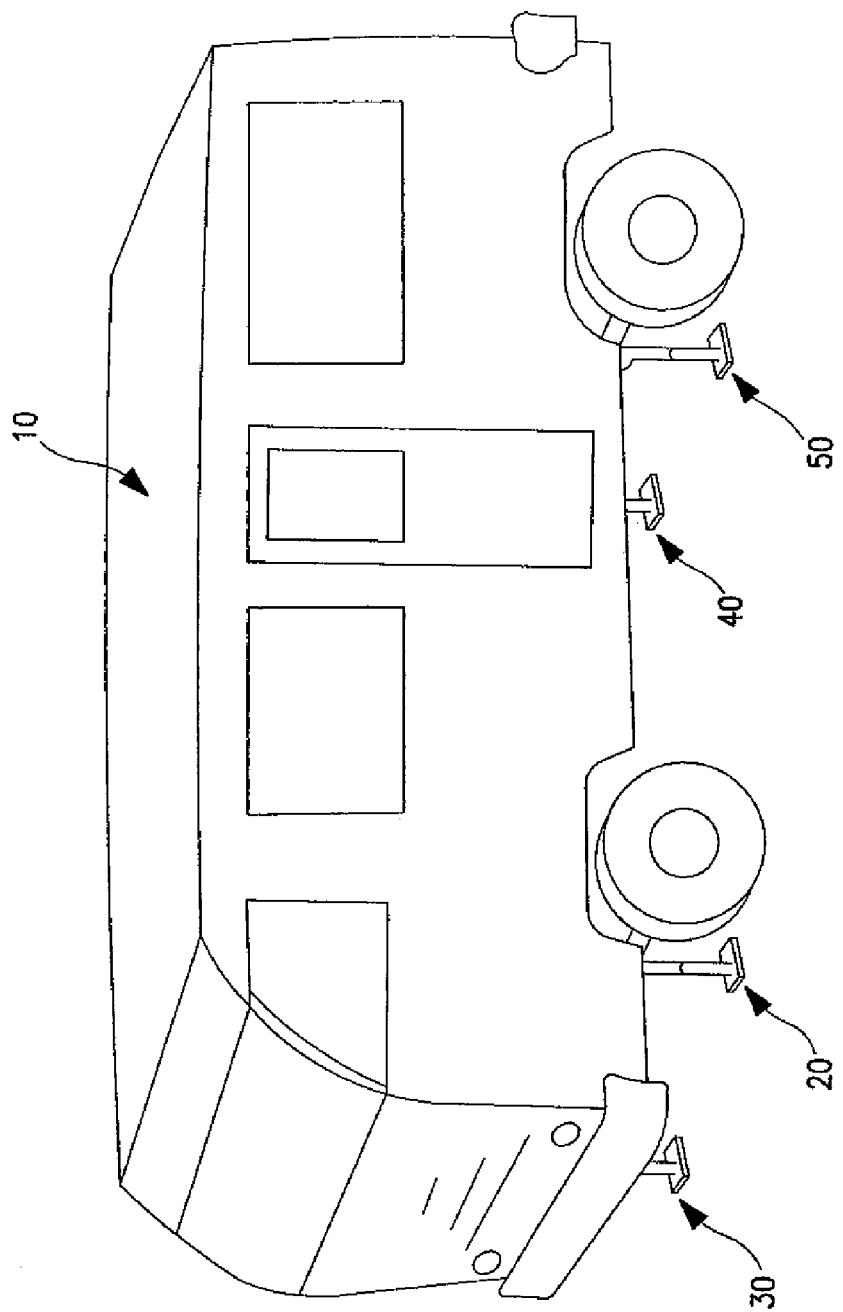
FIG. 1 is a perspective view of a vehicle with extendable legs shown attached to the frame.

Corresponding reference characters indicate corresponding parts throughout the several views. The exemplification set out herein illustrates embodiments of the leveling apparatus and method, and such exemplification is not to be construed as limiting the scope of the leveling apparatus and method in any manner.

DETAILED DESCRIPTION OF THE DRAWINGS

The illustrative embodiments described herein are not intended to be exhaustive or to limit the invention to the precise forms disclosed. Rather, the embodiments selected for description are described to permit those skilled in the art to utilize their teachings.

FIG. 1 depicts a typical recreational vehicle 10 or camper in a parked position with four adjustable legs 20, 30, 40, 50 mounted to the frame of the vehicle adjacent the four respective corners of the vehicle. Obviously, raising or lowering any one of the legs, 20, 30, 40, 50, while it is in contact with the ground, will cause a corresponding upward or downward adjustment of the corner of the vehicle 10 to which the leg is connected. While the description of the present invention provided below assumes that the legs are hydraulically actuated, as is well known in the art, the present invention is equally applicable to a system using electrically actuated legs.

Figure 2:
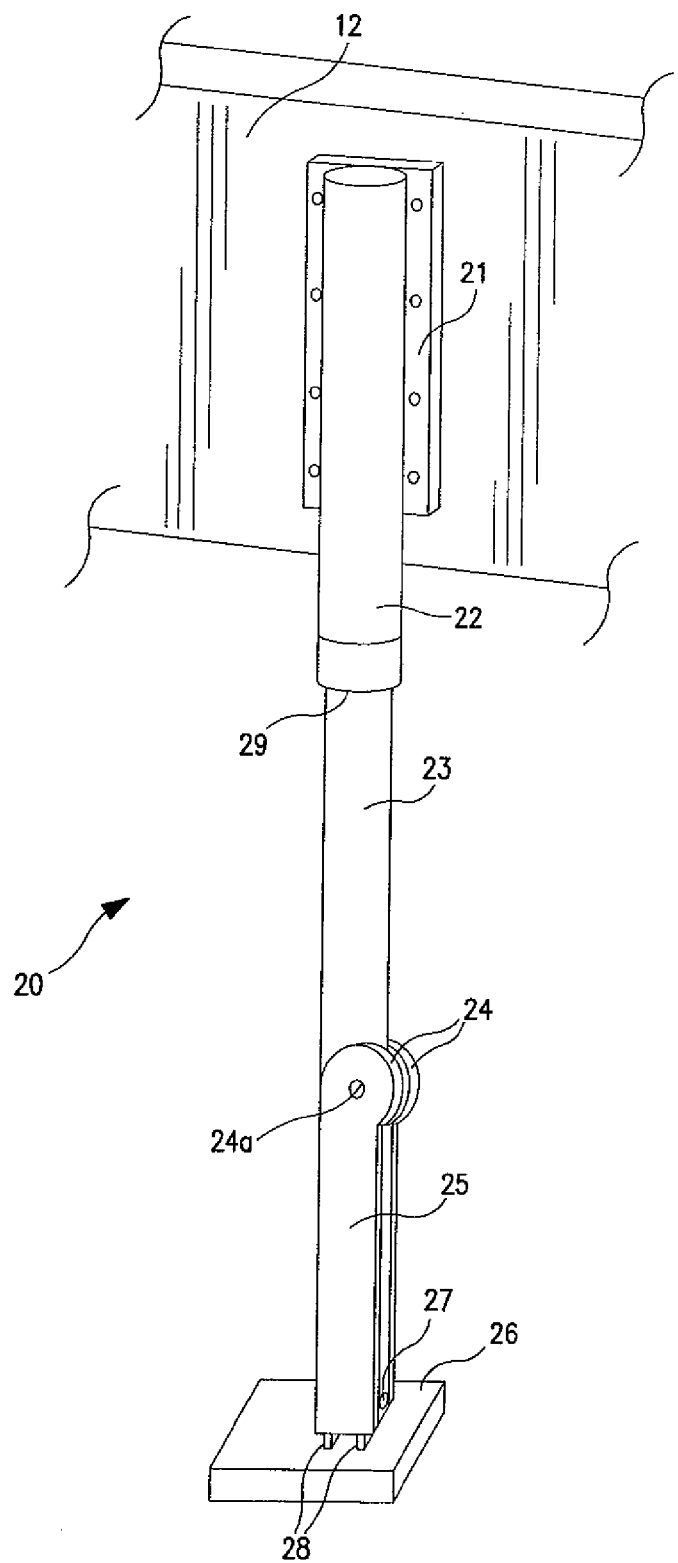
FIG. 2 is a partially fragmented perspective view of an adjustable leg shown in FIG. 1.

As shown in FIG. 2, each leg may be bolted, welded, or otherwise fixedly secured to a portion of the vehicle frame 12. It should be noted that extendable legs of any configuration, such as axially-extending telescopic legs, may be employed by the present invention. The legs described below are merely provided as an example of such extendable legs. Since all legs 20, 30, 40, 50 are identical, only one will be described herein.

Each leg 20 includes a mounting flange 21, an upper cylinder 22, and a piston 23 that are moveable within upper cylinder 22, a pair of cams 24, a lower extension 25, and a foot 26. As shown, foot 26 is pivotally attached to lower extension 25 by a pivot pin 27 that extends through a pair of brackets 28 extending from foot 26.

Figure 3:
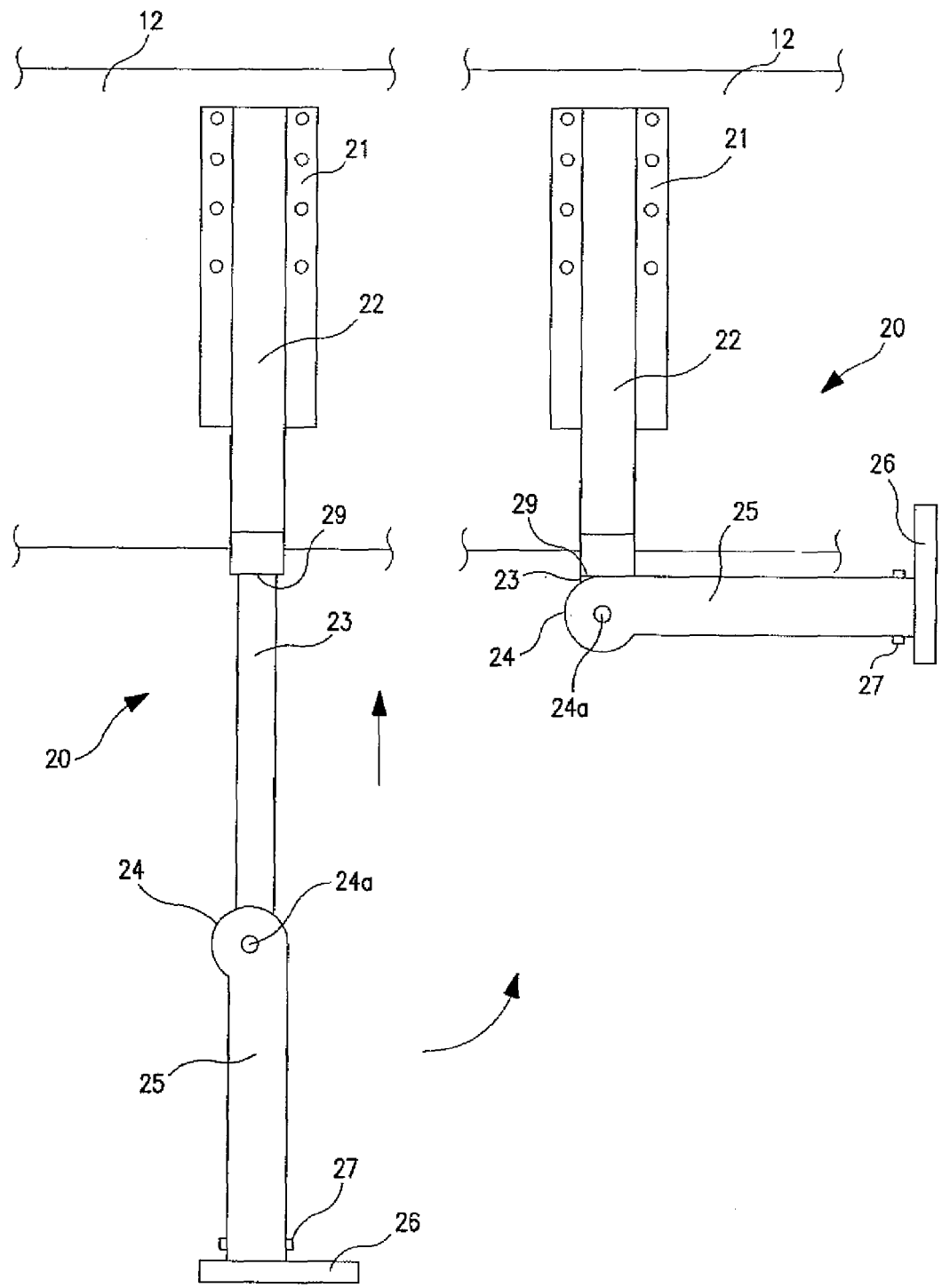
FIG. 3 is a side elevational view of an adjustable leg shown in an extended position and a stowed position.

Referring now to FIG. 3, leg 20 is shown in an extended position, and in a retracted or stowed position. When leg 20 is retracted, piston 23 moves upwardly within upper cylinder 22 until cams 24 engage the lower edge 29 of upper cylinder 22. When this occurs, the shape of cams 24 causes lower leg extension 25 and foot 26 to pivot upwardly about a pivot pin 24a, connecting cams 24 to piston 23 as the piston is further retracted within upper cylinder 22. When leg 20 is in the stowed position, increased clearance is provided under vehicle 10. When leg 20 is extended, piston 23 is moved downwardly by hydraulic pressure or electrically, and the weight of lower leg extension 25 and foot 26 causes the lower leg extension and foot to pivot downwardly as cams 24 disengage lower edge 29 of upper cylinder 22. Further extension of piston 23 causes lower leg extension 25 and foot 26 to move downwardly and engage the ground. Finally, further extension of the piston moves vehicle 10 upwardly.

Figure 4:
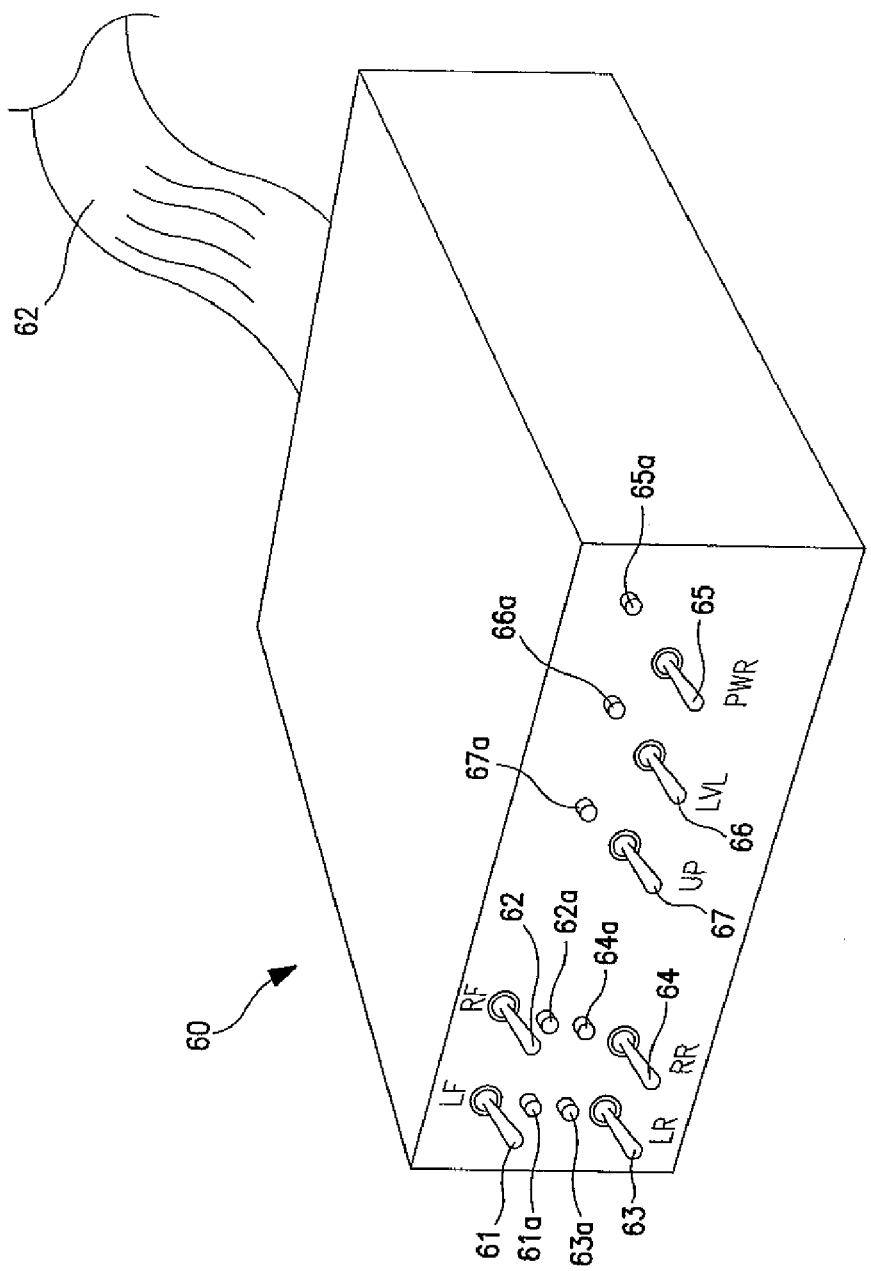
FIG. 4 is a partially fragmented perspective view of a control box according to the present invention.

Referring now to FIG. 4, the system according to the present invention includes a control box 60 that is mounted or located within vehicle 10 for easy access by the occupant. Control box 60 is electrically connected through cabling 62 to hydraulic solenoids 70 which control the individual upward and downward movement of legs 20, 30, 40, 50 in a manner known to those skilled in the art. Control box 60 is also electrically connected to leg sensors 80 mounted adjacent each leg 20, 30, 40, 50, which indicate whether the particular leg is in the stowed position.

A variety of leg sensors 80 may be used and mounted in a variety of locations. For example, a magnetic switch or contact switch (not shown) may be mounted to vehicle frame 12 such that, when lower leg extension 25 is in the stowed position (FIG. 3), the lower leg extension or foot 26 contacts or is in close proximity to the switch, thereby producing a signal indicating that leg 20 is in the stowed position. Finally, control box 60 is electrically connected to the system level sensor 90 which may be mounted at any location on the vehicle.

As shown in FIG. 4, control box 60 includes a plurality of front panel switches and indicator lamps. Manual leg actuation switches 61, 62, 63, 64 are provided in the event the operator wishes to manually adjust the orientation of vehicle 10. When a leg sensor 80 detects that a leg 20, 30, 40, 50 is not in its stowed position, illustratively, for example, because a manual actuation switch 61, 62, 63, 64 has been actuated (upwardly or downwardly), the appropriate manual actuation indicator lamp 61a, 62a, 63a, 64a is illuminated. System power may be turned on and off using the power switch 65. The power indicator lamp 65a provides the operator an indication that power is applied to the system.

The remaining front panel switches include the level switch 66 for commanding the system to automatically level vehicle 10, and the up switch 67 for commanding the system to retract legs 20, 30, 40, 50 in preparation for moving vehicle 10. Of course, when level switch 66 is actuated, the level indicator lamp 66a is illuminated and remains illuminated during the automatic leveling process. Similarly, when up switch 67 is actuated, the up indicator lamp 67a is illuminated and remains illuminated during the process of retracting the legs 20, 30, 40, 50. An audible warning may be sounded during any automatic movement of the legs 20, 30, 40, 50.

Figure 5:
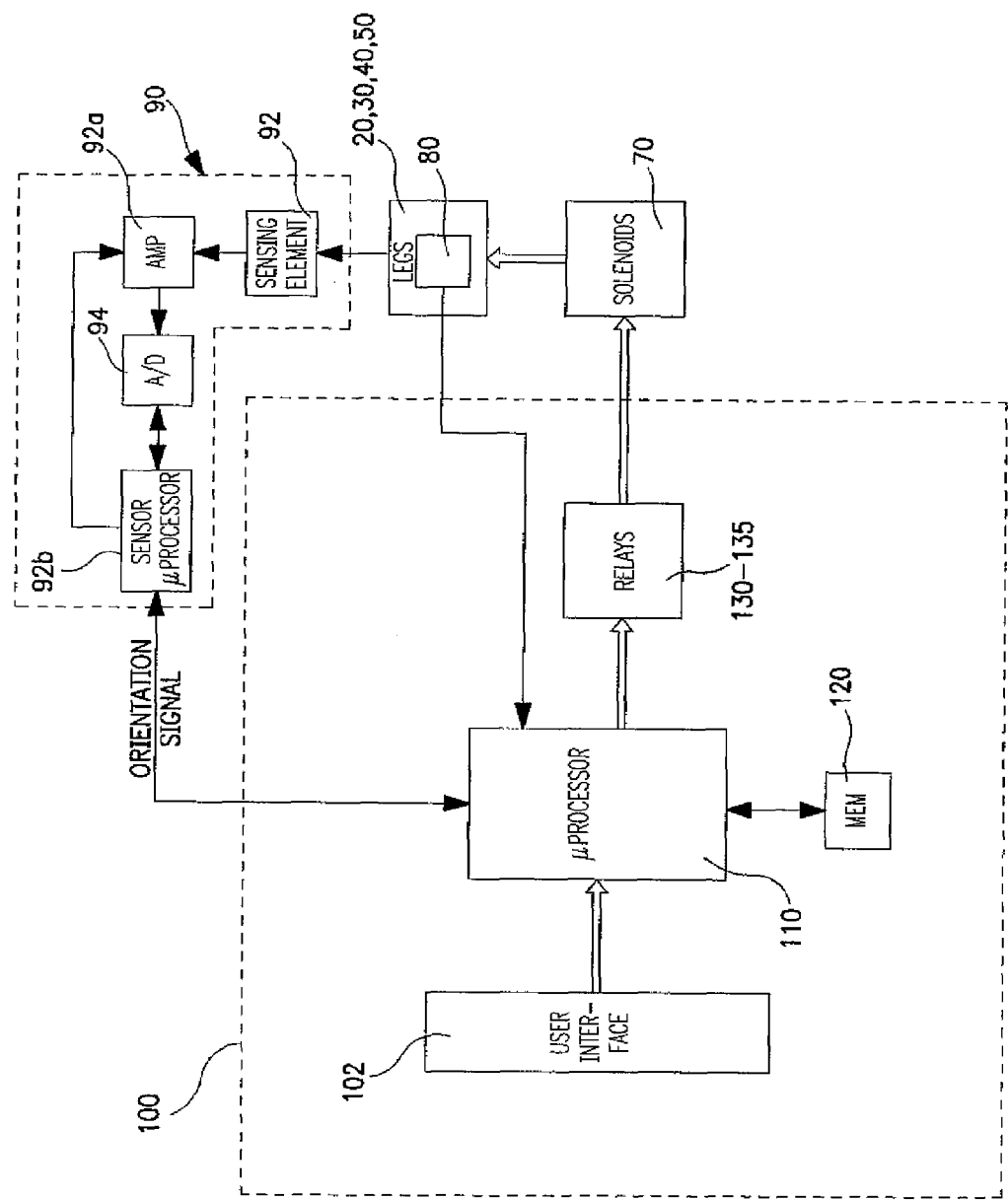
FIG. 5 is a schematic diagram of a system according to the present invention.

FIG. 5 is a schematic diagram of an automatic leveling system according to the present invention. As shown, the control box houses a controller circuit 100 including user interface 102 (switches 61–67 described above), a microprocessor 110, a memory 120, and a plurality of relays 130, 131, 132, 133, 134, 135. The operator provides input to user interface 102 (by actuating a switch, such as level switch 66) that results in a signal to microprocessor 110. The signal may be a command to raise or lower one or more of legs 20, 30, 40, 50. Accordingly, microprocessor 110 will generate an appropriate signal to actuate an appropriate relay 130–135, which in turn drives solenoids 70 which control movement of legs 20, 30, 40, 50. Controller circuit memory 120 includes data representing a reference level plane. Microprocessor 110 uses this data during the automatic leveling process, as will be described in greater detail below.

Again referring to FIG. 5, each of legs 20, 30, 40, 50 includes leg sensor 80 which provides a signal to microprocessor 110 indicating whether the leg is in the stowed position, as described above. Obviously, adjustment of any of the legs, assuming the leg is in contact with the ground, results in adjustment of the orientation of vehicle 10. Accordingly, level sensor 90, which is fixedly mounted to vehicle 10, will likewise experience a change in position. This relationship between legs 20, 30, 40, 50 and level sensor 90 is indicated by the dashed arrow shown in FIG. 5. Level sensor 90 continuously reports an orientation signal representing the orientation (pitch and roll) of vehicle 10 to a sensor controller 92*b* where it is maintained and reported upon request by microprocessor 110.

Level sensor 90 may be any type of dual axis sensing element 92 which provides a signal indicating whether vehicle 10 is level along its longitudinal axis (pitch, front to back), and a signal indicating whether vehicle 10 is level along its lateral axis (side to side). In one embodiment of the invention, a dual axis tilt/inclinometer sensing element 92 is used, such as Part No. AU6006-A-010 manufactured by Spectron Glass & Electronics, Inc. of Hauppaugue, N.Y. It is appreciated, however, that other suitable sensing means may be incorporated as advances in technology may deem appropriate. This sensing element 92 provides analog signals based on the pitch position of conductive fluid (representing the pitch of the vehicle) and the roll position of the conductive fluid (representing the roll of the vehicle).

As shown in FIG. 5, the analog signals are amplified and conditioned by amplifier 92*a*, routed through an analog to digital convertor 94, and outputted in digital form to sensor controller 92*b* where the signals are maintained for delivery as the orientation signal to controller circuit 100. The sensor microcontroller 92*b* may also be commanded to alter the gain and offset values of amplifier 92*a* to achieve a suitable signal representation of the vehicle pitch and roll.

Figure 6:
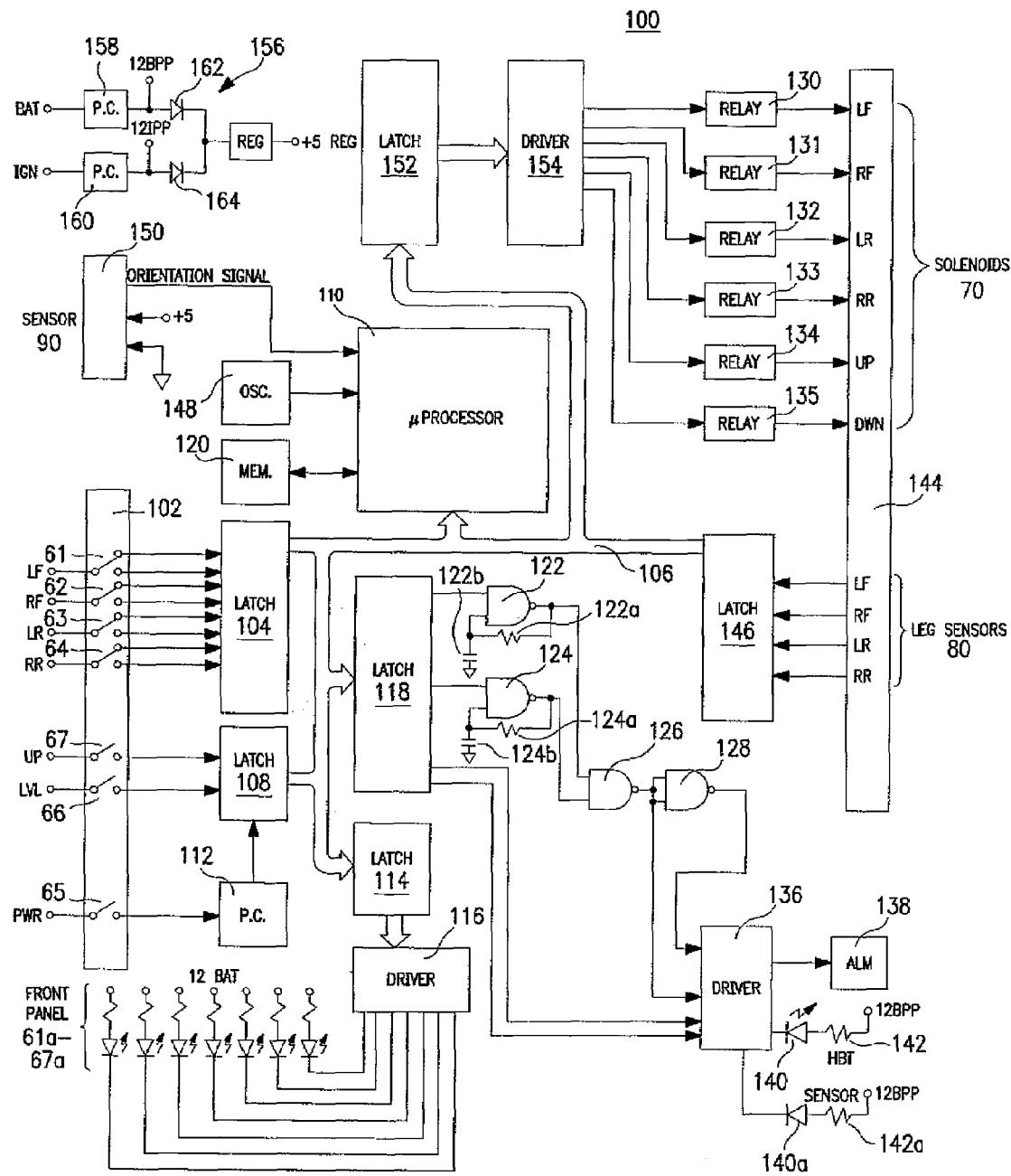
FIG. 6 is another schematic diagram of a system according to the present invention.

Referring now to FIG. 6, an illustrative embodiment of controller circuit 100 of FIG. 5 is shown. Front panel switches 61–67 are shown as included within user interface 102. Manual adjustment switches 61–64 are connected to a latch 104, which outputs data to microprocessor 110 over data bus 106. Each manual switch can provide an up signal and a down signal. Up switch 67 and level switch 66 are similarly connected to a latch 108 which outputs to data bus 106. Power switch 65 causes battery power to be passed through a power conditioning circuit 112, which results in a signal to latch 108 and an output to microprocessor 110 via data bus 106. Power from switch 65 may be safely interlocked with relays 130–135, or other suitable power driver devices, such that the relays cannot operate in the absence of power according to practices well known by those skilled in the art. Microprocessor 110 is connected through data bus 106 to another latch 114 which is connected to a driver 116 for illuminating front panel indicators 61*a*–67*a* corresponding to front panel switches 61–67.

Microprocessor 110 is also connected through data bus 106 to another latch 118 which is connected to a pair of NAND gates 122, 124, each configured with a resistor 122*a*, 124*a* and a capacitor 122*b*, 124*b* of values to generate an output signal which pulses at a particular frequency in a manner known to those skilled in the art. The frequency of the output of NAND gate 122 is different from the frequency of the output of NAND gate 124. The output signals of NAND gates 122, 124 are routed to another pair of NAND gates 126, 128 and through a driver 136 to an alarm circuit 138, the operation of which will be further described below.

Latch 118 also has a pair of outputs that are routed through driver 136. One of these outputs operates a heartbeat LED 140 and resistor 142 circuit which continuously flashes to indicate that microprocessor 110 of controller circuit 100 is operational. The other output operates a sensor LED 140*a* and resistor 142*a* circuit which is turned on when valid communications have been established between microprocessor 110 and sensor microprocessor 92*b*, indicating that the sensor 90 and its wiring are operational.

Again, referring to FIG. 6, sensor signals from leg sensors 80 are routed through a connector 144 to a latch 146. The output of latch 146 is connected to microprocessor 110 via data bus 106. As indicated above, the state of each of the leg sensor signals indicates whether the corresponding leg 20, 30, 40, 50 is in the stowed or extended position.

Microprocessor 110 is connected to data bus 106, memory 120, an oscillator 148, and a connector 150, which is routed to level sensor 90. Oscillator 120 is of a configuration commonly known by those skilled in the art. Memory 120 may be a variety of different components and circuits which provide non-volatile memory storage. In fact, memory 120 may be a part of microprocessor 110. Microprocessor 110 is connected to latch 152 via data bus 106, which provides output to a driver 154, which is capable of driving relays 130–135. Relays 130–133 are routed through connector 144 and are individually connected to solenoids 70, which drive legs 20, 30, 40, and 50. The two remaining relays 134, 135 are connected to solenoids that control the direction of actuation of legs 20, 30, 40, 50.

The power distribution circuit 156 includes power conditioning circuits 158, 160 which receive 12-volt power from the vehicle battery (12 BAT) and 12-volt power from the vehicle ignition system (12 IGN). Conditioned battery power (12 BPP) is distributed to various locations in controller circuit 100. Likewise, conditioned ignition power (12 IPP) is distributed to various locations in controller circuit 100, as well as providing an input (not shown) to microprocessor 110 which may be used to interlock the system such that no leg may be extended when the vehicle 10 may be in motion. The signal is also interlocked with signals from leg sensors 80 to cause an alarm if the vehicle 10 is about to move with any leg 20, 30, 40, 50 in an unstowed position. Both 12-volt power lines are passed through diodes 162, 164 into a regulator circuit 166, which regulates the 12-volt signal to a positive 5-volt signal for use with the logic devices of controller circuit 100.

Once power is applied to the circuit, microprocessor 100 sends a continuous signal through data bus 106 to latch 118, which in turn provides a signal to driver 136 which drives heartbeat LED 140 indicating that power is applied and microprocessor 110 is working. If an operator wishes to raise the left front corner of vehicle 10, for example, the operator may move manual adjustment switch 61 into the down (extend) position, which provides a signal to latch 104. Latch 104 outputs a signal to microprocessor 110 via data bus 106. Microprocessor 110 interprets the signal as a command to further extend left front leg 20. Microprocessor 110 generates an output signal which passes from latch 152 via data bus 106 to driver 154, and results in actuating up relay 134 and left front relay 130. These relays pass signals through connector 144 to solenoids 70 (FIG. 6), which actuate left front leg 20, causing it to extend so long as the signals are present. Any of the remaining legs 30, 40, 50 may be manually adjusted in this manner.

Whenever a leg 20, 30, 40, 50 is extended from its stowed position, its respective leg sensor 80 sends a signal to latch 146. Latch 146 signals microprocessor 110 via data bus 106. Microprocessor 110 interprets these signals and, in turn, sends signals to latch 114 via data bus 106 to activate the corresponding LED 61a–67a. The signal may be intermittent to indicate a fault, such as failure of a leg to leave the stowed position.

If the operator actuates level switch 66, the automatic leveling process begins. Level switch 66 generates a signal, which is passed through latch 108 to microprocessor 110 via data bus 106. Microprocessor 110 interprets the signal as a command to automatically level vehicle 10. Microprocessor 110 verifies that vehicle 10 ignition power is absent, that there is sufficient vehicle power, that a valid reference level plane has been stored in memory 120, and that valid communication with an operational level sensor 90 exists. If any faults are present, microprocessor 110 denies the operator request with a signal via data bus 106 through latch 118, NAND gates 122–128, and driver 136 to alarm 138. Microprocessor 110 also provides a visual indication of a fault condition via data bus 106 through latch 114 and driver 116 to LED 66a. Microprocessor 110 reads the latched leg sensor 80 signals to verify that all legs 20, 30, 40, 50 are presently in their stowed position. All legs will typically be in the stowed position because level switch 66 is generally the first switch actuated after parking vehicle 10 at a desired location. If any leg 20, 30, 40, 50 is not in the stowed position, microprocessor 110 actuates that leg in the up direction until microprocessor 110 receives a leg sensor 80 signal indicating that the leg has been moved into the stowed position.

After the stowed position of the legs has been confirmed, microprocessor 110 actuates one of the legs, for example, left front leg 20, (through latch 152, driver 154, relay 130, connector 144, and solenoid 70, as described above) for a predetermined period (in one embodiment, approximately 1.5 seconds) to lower piston 23 of the leg 20 such that leg cams 24 disengage from lower edge 29 of upper cylinder 22, and lower leg extension 25 and foot 26 swing downwardly into alignment with upper cylinder 22. Immediately after actuating a leg in this manner, microprocessor 110 counts a predetermined period of time without executing further commands while the leg stops swinging.

Microprocessor 110 then monitors the orientation signal received from level sensor 90 as microprocessor 110 further actuates one of the legs, for example, left front leg 20, extending it downwardly until it engages the ground. When leg 20 engages the ground and continues to extend, it raises the left front corner of vehicle 10. When microprocessor 110 determines from the orientation signal that that corner has been raised (some fraction of a degree), microprocessor 110 stops actuating leg 20. Microprocessor 110 continues actuating the remaining legs 30, 40, 50, sequentially, and monitoring the orientation signal to determine when each leg engages the ground (that is, when level sensor 90 indicates that the orientation of vehicle 10 has changed by a small amount).

After all legs 20, 30, 40, 50 have been extended sufficiently to engage the ground, microprocessor 110 reads the orientation signal from level sensor 90 and compares it to data stored in memory 120, representing a reference level plane. As will be further described below, the reference level plane generally corresponds to a vehicle orientation, which results in the interior of the vehicle feeling at true level relative to horizontal. The microprocessor 110 determines, based on this data, the low end of vehicle 10 and the low side of vehicle 10. Finally, microprocessor 110 begins leg adjustment, as described below, such that the actual vehicle orientation approaches the reference level plane.

Figure 7:
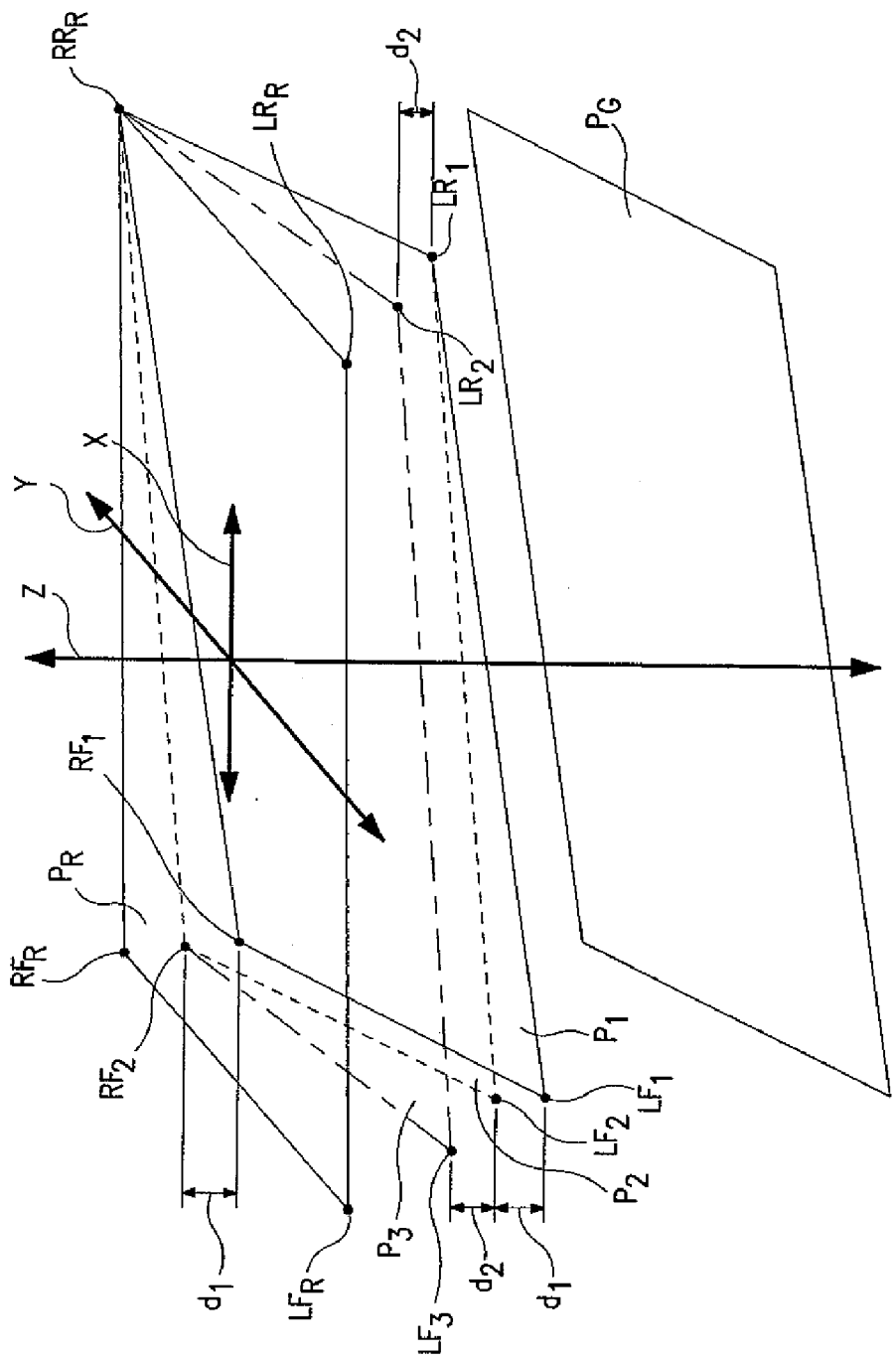
FIG. 7 is a three-dimensional diagram of various planes to illustrate the method of adjustment of the vehicle orientation according to the present invention.

Referring now to FIG. 7, plane $P_G$ represents the plane of the ground on which vehicle 10 is parked. Plane $P_1$ represents the plane of the vehicle before any leveling adjustment has been performed (but after all legs have engaged the ground). It should be noted that the plane $P_1$ is approximately parallel to the plane $P_G$. Plane $P_1$ is defined by the elevation of frame 12 at the four mounting locations of each of the four legs. Thus, the plane $P_1$ of FIG. 7 is defined by the points $LF_1$ (the initial position of the left front corner of vehicle 10 when left front leg 20 first engages the ground), $RF_1$ (the initial position of the right front corner of vehicle 10 after right front leg 30 engages the ground), $RR_R$ (the initial position of the right rear corner of vehicle after right rear leg 40 has engaged the ground), and $LR_1$ (the initial position of the left rear corner of vehicle 10 after left rear leg 50 has engaged the ground).

Plane $P_R$ represents the reference level plane stored in memory 120. The plane $P_R$ is similarly defined by four points ($LF_R$, $RF_R$, $RR_R$, and $LR_R$). The reference plane $P_R$ passes through the vertical Z-axis and contains the X and Y axes of the coordinate system of FIG. 7. As should be apparent from the foregoing, when vehicle 10 is in the reference level plane $P_R$, or a plane which is parallel to the plane $P_R$, vehicle 10 is preferably at true level (the pitch of vehicle 10 front to back is parallel with the X axis, and the roll of vehicle 10 side to side is parallel with the Y axis).

When microprocessor 110 compares the present orientation signal received from level sensor 90 to the data representing the reference level plane $P_R$ received from memory 120, the microprocessor 110 may determine, for example, that the front end of vehicle 10 is low and the left side of vehicle 10 is low (below a plane parallel with the reference level plane $P_R$). Accordingly, microprocessor 110 determines that the point $LF_1$ is the low corner of vehicle 10. As such, microprocessor 110 executes the auto-leveling program by extending left front leg 20, in the manner described above, for a first predetermined period of time (for example, one second). The left front corner of vehicle 10 will move upwardly a distance $d_1$ to the position labeled $LF_2$. Next, right front leg 30 is actuated for the same predetermined period of time such that it travels upwardly a distance $d_1$ to the position labeled $RF_2$. In this manner, the front end of vehicle 10 experiences an upward adjustment by individual adjustments to left front leg 20 and right front leg 30.

Microprocessor 110 next causes an upward adjustment of the low side of vehicle 10 (the left side) by individually actuating left front leg 20 and left rear leg 50. First, left front leg 20 is actuated upwardly for the same predetermined period of time such that the left front corner of vehicle 10 moves from the position $LF_2$ to the position $LF_3$ (equivalent to an upward adjustment of the distance $d_2$). Finally, left rear leg 50 is actuated for the predetermined period of time such that the point $LR_1$ moves to the point $LR_2$ (corresponding to an upward adjustment of distance $d_2$).

The above-described adjustment sequence constitutes one iteration of the automatic leveling sequence. After the first iteration, the vehicle frame has passed through the plane $P_2$ (resulting from adjustment of the front end of vehicle 10) and lies in plane $P_3$ that is defined by corners $LF_3$, $RF_2$, $RR_R$, and $LR_2$. As is apparent from the figure, the plane $P_3$ represents a front end of vehicle 10, which is still below the reference level plane $P_R$, and a left side of vehicle 10, which is still below the reference level plane $P_R$. Accordingly, microprocessor 110 will continue to execute adjustment iterations, monitoring the orientation signal from level sensor 90 after each adjustment of each leg to determine the position of the leg relative to the reference level plane $P_R$. Each adjustment iteration is characterized by individual actuations of left front leg 20 and right front leg 30 followed by individual actuations of left front leg 20 and left rear leg 50. Each upward adjustment of each leg is for the predetermined period of time as described above.

Figure 8:
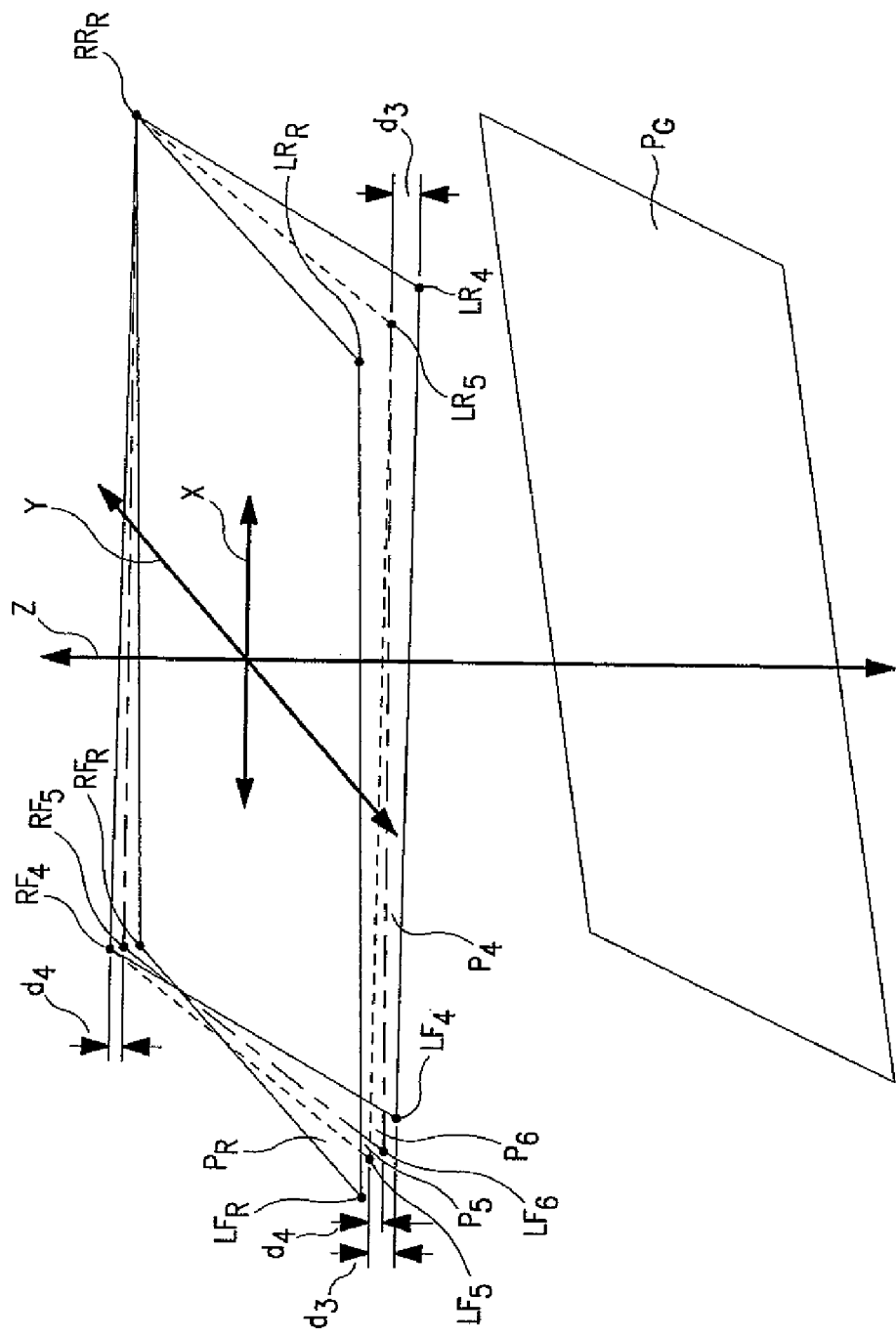
FIG. 8 is a three-dimensional diagram of various planes similar to FIG. 7.

Referring now to FIG. 8, the plane $P_4$ represents the orientation of vehicle 10 after multiple iterations of upward adjustments, as described above. The plane $P_4$ is bounded by the points $LF_4$, $RF_4$, $RR_R$, and $LR_4$. The point $RF_4$ is above the right front point $RF_R$ of the referenced level plane $P_R$. The plane $P_4$ represents an orientation wherein the front end of vehicle 10 is one adjustment away from passing through the reference level plane $P_R$. Assume that the next adjustment in the sequence illustrated in FIG. 8 is an upward adjustment of the left side of vehicle 10. The point $LF_4$ is moved to the point $LF_5$ by microprocessor 110. Actuation of left front leg 20 for the predetermined period of time results in an upward adjustment of distance $d_3$. Next, left rear leg 50 is actuated by microprocessor 110 for the predetermined period of time such that the point $LR_4$ is moved to the point $LR_5$ (a distance of $d_3$). At this orientation, vehicle 10 lies in the plane $P_5$, and the front end of vehicle 10 has passed through the reference level plane $P_R$. Because the automatic leveling sequence alternates between adjustments of the legs on one side and one end of vehicle 10, the next adjustment is made to the front end of vehicle 10.

Microprocessor 110 interprets the orientation signal from level sensor 90 and determines upon comparison of that signal to the data representing the reference level plane $P_R$ stored in memory 120 that the front end of vehicle 10 has passed through the reference level plane $P_R$. Accordingly, microprocessor 110 actuates left front leg 20 of the vehicle 10 in a downward direction for a second predetermined period of time, which is less than the first predetermined period of time. In one embodiment of the invention, the second predetermined period of time is approximately one-half the first predetermined period of time (or ½ second). As is shown in the figure, the left front point $LF_5$ is moved downwardly to the left front point $LF_6$ during this adjustment (a downward adjustment of the distance $d_4$). The distance $d_4$ is less than the distance $d_3$ because the time period for actuation of leg 20 in the downward direction is less than the time period for actuation of leg 20 in the upward direction.

Right front leg 30 is likewise adjusted in the downward direction by microprocessor 110 such that right front corner of vehicle 10 moves from the point $RF_4$ to the point $RF_5$ (a distance $d_4$). The plane $P_6$ represents the orientation of vehicle 10 after the adjustments described above have been accomplished. As should be apparent, the front end of the vehicle remains above the reference level plane $P_R$, but closer to the plane $P_R$ than its previous orientation, and the left side of vehicle 10 remains below the plane $P_R$, but closer than the orientation preceding these adjustments. Microprocessor 110 carries out the automatic leveling sequence in this manner until vehicle 10's orientation, as represented by the orientation signal from level sensor 90, is approximately the same as the reference level plane $P_R$. Each time the orientation signal indicates that an end or side of vehicle 10 has been adjusted upwardly or downwardly through the reference level plane $P_R$, the period of time for actuation (either upward or downward) of that end or side of the vehicle 10 is reduced. In this manner, as microprocessor 110 alternates between sequential adjustments of front legs 20, 30 and sequential adjustments of left legs 20, 50, vehicle 10 continues to approach the reference level plane $P_R$. The automatic leveling sequence is discontinued by microprocessor 110 when the period of time of actuation of the legs has been reduced to a sufficiently small increment, or the difference between the reference plane $P_R$ stored in memory 120 and the actual vehicle plane as measured by sensor 90 is within a specified tolerance, or after a time-out period of, for example, three minutes, expires.

When level is reached, microprocessor 110 generates a signal on data bus 106 that sounds alarm 138 in a manner indicating a successful level. Additionally, a signal of data bus 106 is passed through latch 114 and disables driver 116, driving front panel indicator 66a corresponding to level switch 66.

When the operator is ready to relocate vehicle 10, the operator may actuate the up switch 67, which generates a signal at latch 104 and via data bus 106 to microprocessor 110. This signal is interacted by microprocessor 110 as a command to retract all legs 20, 30, 40, 50 until they reach their respective stowed positions. Accordingly, microprocessor 110 generates a signal through data bus 106 to latch 114 and driver 116 to cause front panel indicator 67a to be illuminated. Additionally, microprocessor 110 actuates relays 130, 131, 132, 133 corresponding to legs 20, 30, 40, 50, and relay 134 corresponding to the up direction solenoid. As a result, all legs 20, 30, 40, 50 retract as pistons 23 are drawn within upper cylinders 22 of each leg. Eventually, cams 24 of each leg engage lower end 29 of upper cylinder 22, and lower leg extension 25 and foot 26 pivot into the stowed position. Each time a leg pivots into the stowed position, leg sensor 80 generates a signal that passes through latch 146 to microprocessor 110 indicating that leg's stowed status.

An additional feature of the automatic leveling system according to the present invention is the ability of the system to recalibrate or reset the reference level plane $P_R$. While level sensor 90 should be installed on vehicle 10 such that the reference level plane $P_R$ is as close to true level as possible, after time or when the vehicle is loaded with equipment or fueled up, it is possible that the actual interior level orientation is different from the initial reference level setting. Accordingly, it is desirable to be able to recalibrate the reference level plane $P_R$ in the field. The procedure for recalibrating the reference level plane $P_R$ includes positioning vehicle 10 on a flat surface or using the manual controls to level the system such that the vehicle feels or measures level from the inside of the vehicle. Power switch 65 is then moved into the off position. The operator then actuates level switch 66 and power switch 65. If, upon power up, microprocessor 110 detects a signal from level switch 66, microprocessor 110 will interpret that signal as a command to enter the recalibrate reference level mode. When in this mode, microprocessor 110 reads the digital orientation signal from level sensor 90 and outputs that data to memory 120, thereby replacing the previous reference level plane data with the newly calibrated reference level plane data. The microprocessor 110 may also command sensor microprocessor 92b to adjust sensor amplifier 92a circuit for optimum range and resolution of sensor 90.

Figure 9:
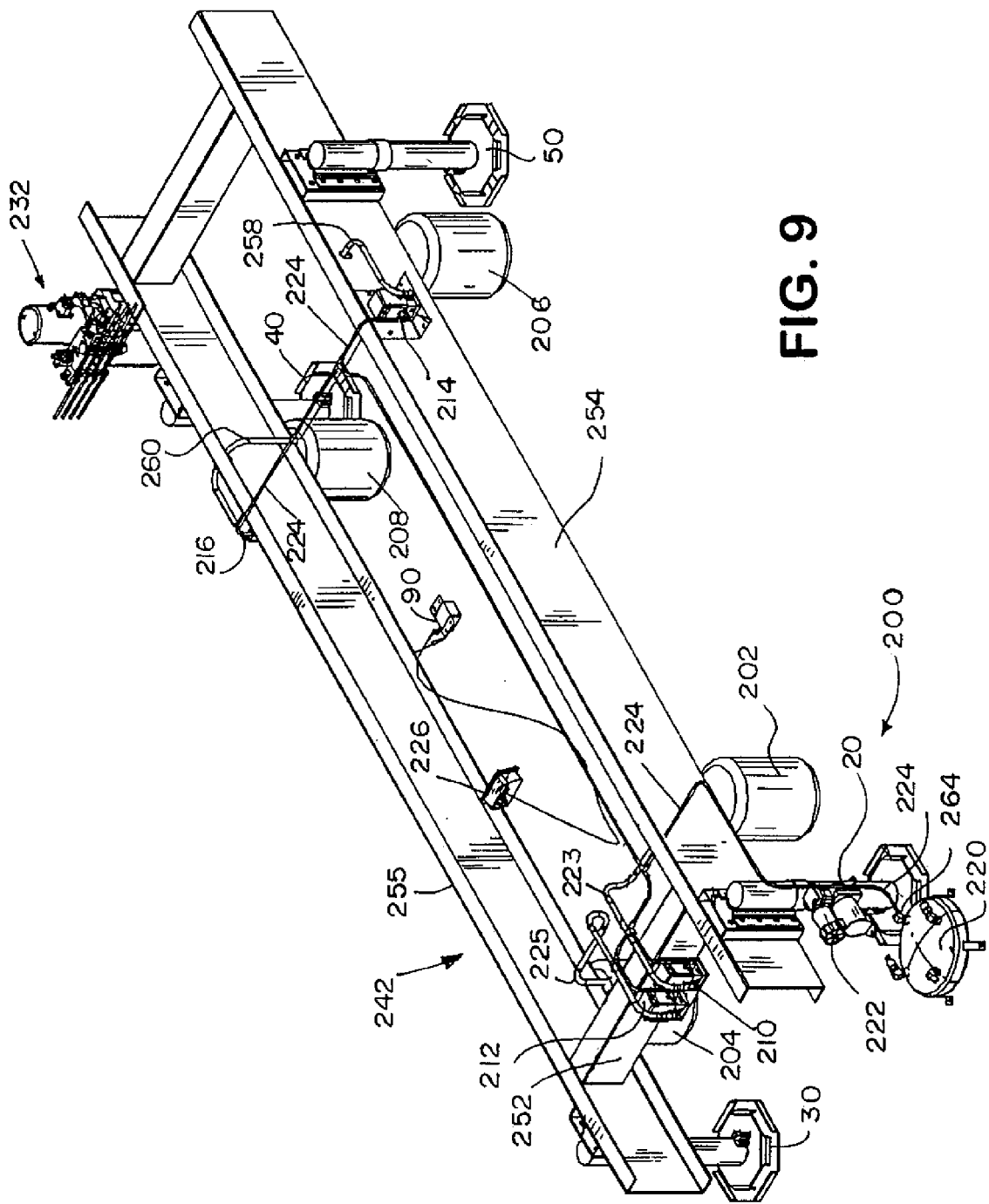
FIG. 9 is a perspective view of an illustrative frame assembly comprising a fluid leveling apparatus.

FIGS. 9 through 17 disclose additional embodiments of the leveling apparatus, including an air suspension leveling apparatus. As shown in FIG. 9, air suspension leveling apparatus 200 can overlay a conventional hydraulic jack leveling apparatus, or an apparatus as disclosed in FIGS. 1 through 8. Air suspension leveling apparatus 200 is illustratively configured to electromechanically control the vehicle fluid or air spring suspension system by either inflating or deflating individual air springs 202, 204, 206, and 208 on level vehicle 10. (See, also, FIG. 1.)

In an illustrative embodiment, air suspension leveling apparatus 200 employs portions of the same leveling apparatus described in FIGS. 1 through 8. For example, as shown in FIG. 6 of the previous embodiment, relays 130 through 133 and controller circuit 100 are connected to solenoids 70, with the two remaining relays 134, 135 connected to solenoids that control the direction of actuation of legs 20, 30, 40, 50. Using controller circuit 100 on air suspension leveling apparatus 200, relays 130 through 133 are connected to air valves 210, 212, 214, 216. (See, also, FIG. 10.) It is appreciated that air valves 210, 212, 214, 216 correspond to, and are configured to supply air to, air springs 202, 204, 206, 208, respectively. When the automatic leveling process is initiated, microprocessor 110 sends a signal to air valves 210, 212, 214, 216, switching them into a mode that disables or "blocks" the air supply path between the ride height sensor/adjustment assembly 218 and air springs 202, 204, 206, 208. In an illustrative embodiment, relay 134 provides a blocking signal to air valves 210, 212, 214, 216. Conversely, relay 135 provides an unblocking signal to air valves 210, 212, 214, 216, releasing the vehicle from apparatus 200. (See, also, FIG. 10.)

Microprocessor 110 sends a series of inflate (extend) or deflate (retract) signals to air valves 210, 212, 214, 216 to facilitate the leveling process, as otherwise described in the previous embodiment. Air necessary for this process may be supplied by air supply 232 or supplemented by an auxiliary air supply reservoir 220 and/or auxiliary compressor 222. It is appreciated that reservoir 220 and compressor 222 can supply air through an independent system of supply tubing 224, as shown in both FIGS. 9 and 10.

Vehicle 10 can also be manually adjusted by operating individual air springs, similar to that described in the previous embodiment. For example, if it is desired to raise the left front corner of vehicle 10, manual adjustment switch 61 can be activated to provide a signal to latch 104. (See FIGS. 4, 6, and 9.) Latch 104 outputs a signal to microprocessor 110 via data bus 106. Microprocessor 110 interprets the signal as a command to further inflate left front air spring 202. Microprocessor 110 also generates an output signal which passes to latch 152 via data bus 106 to driver 154, and results in actuating relay 134 and left front relay 130. The signal inflates the left front air spring 202, which continues to expand so long as the signals are present. The remaining air springs 204, 206, 208 may also be independently adjusted in this manner.

Illustratively, common to both embodiments of the leveling apparatus is level sensor 90 and the microprocessor algorithms which establish the level condition Pr as well as determine where and to what extent vehicle 10 is out of this level condition. (See, also, FIGS. 1, 5, and 7.) Both embodiments may also share a common operator control panel 226. (See, for example, FIG. 15.) Illustratively, an operator has the option to determine which leveling system is to be activated by depressing either the "AIR" or "HYD" buttons 228, 230, respectively, on control panel 226. If the operator selects the "AIR" button 228, the signal from relay 134 is redirected through electrical harness 290 to air valves 210, 212, 214, 216, shifting them to the blocking mode. (See, also, FIG. 11.) This mode blocks the vehicle's suspension control of air springs 202, 204, 206, 208, and directs air valves 210, 212, 214, 216 to control the inflation state of the corresponding air springs. (See, also, FIGS. 13 and 14.) In the illustrative embodiment, apparatus 200 can derive its air supply from the vehicle's main air supply 232 or an alternate source. When the vehicle is in motion, air supply 232 provides air through tubes 234 and sensors 218 to supply the appropriate amount of air to the air springs 202, 204, 206, 208 for suspension of the vehicle. (See FIG. 10.)

When vehicle 10 is at rest and leveling is desired, air supply 232 can provide air to air valves 210, 212, 214, 216 via tubes 224 by supplying air through tube 236 and illustratively passing through reservoir 220. If supply 232 becomes depleted or does not function, the auxiliary reservoir 220 and compressor 222 can provide auxiliary air supply to air valves 210, 212, 214, 216. This can be accomplished by attaching a pressure sensor switch (not shown) to auxiliary reservoir 220. When the pressure sensor switch detects an inadequate or depleted pressure from supply 232, it activates compressor 222 which changes the air pressure in reservoir 220. It is appreciated that a check valve can be employed between supply 232 and reservoir 220. Illustratively, in either case, when one or more of the air springs 202, 204, 206, 208 is inflated, air flows, through supply tubes 224, air valves 210, 212, 214, 216, and into the respective air spring(s). In contrast, when an air valve 210, 212, 214, or 216 is activated to deflate corresponding air spring 202, 204, 206, or 208, a portion of the air in the air spring is exhausted through an exhaust port 238 on the corresponding air valve. (See FIG. 14.) A series of such coordinated activations affects the leveling by inflating (raising) or deflating (lowering) air springs 202, 204, 206, 208 until a level condition is reached.

When it becomes necessary for leveled vehicle 10 to travel again, illustratively, a "return to normal" button 250 on vehicle 10 is pressed. (See FIG. 15.) A signal from relay 135 is redirected through electrical harness 290 and is sent to air valves 210, 212, 214, 216, returning control of air springs 202, 204, 206, 208 to the vehicle's suspension system.

Figure 10:
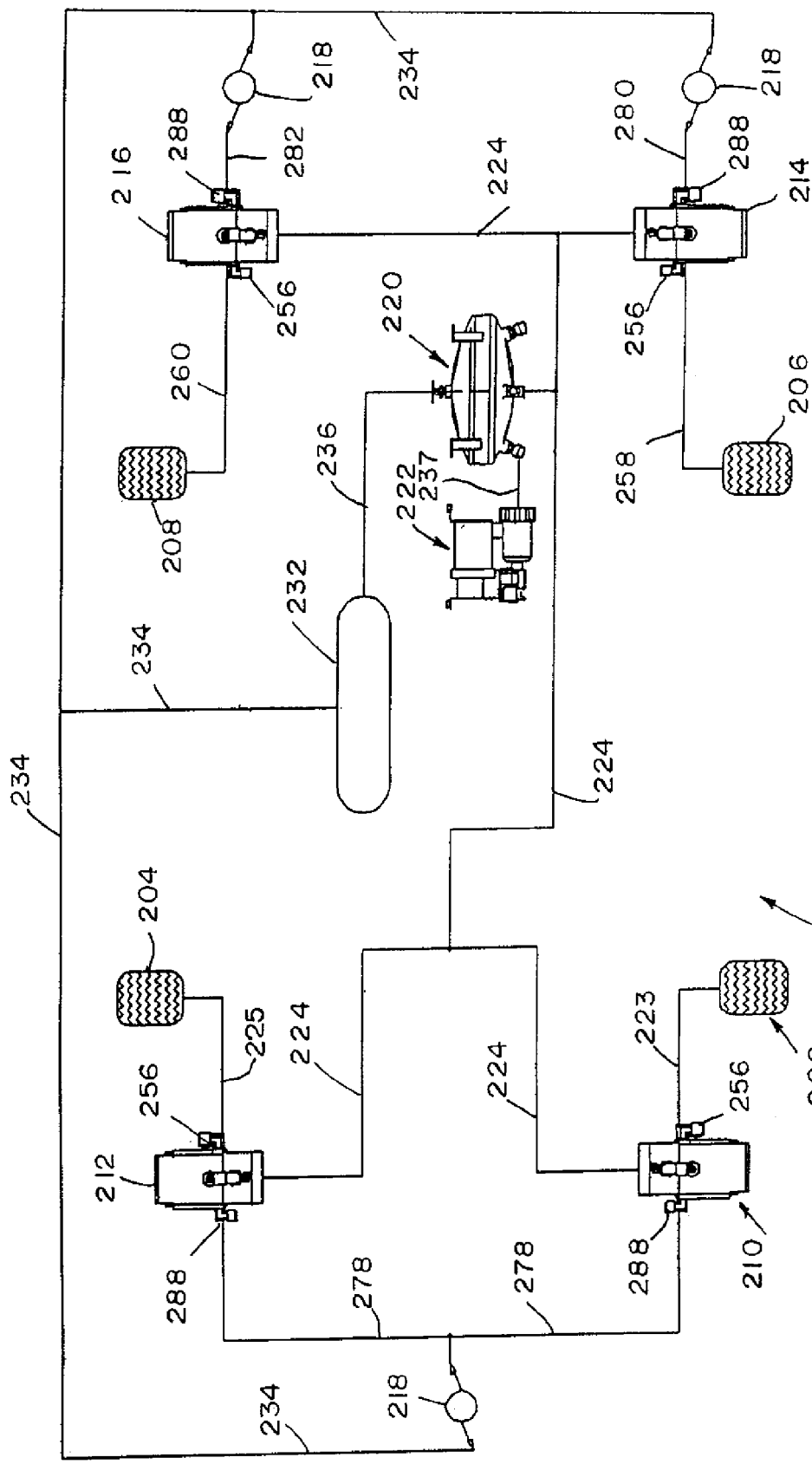
FIG. 10 is a schematic view of the fluid leveling apparatus.

Referring specifically to FIG. 9, air suspension leveling apparatus 200 is illustratively shown integrated with a vehicle frame 242. This illustrative embodiment shows both air springs 202, 204, 206, 208 and jack legs 20, 30, 40, 50. (See, also, FIG. 1.) Though not shown, it is contemplated that springs 202, 204, 206, 208 are themselves attached to respective wheel assemblies of the vehicle to provide conventional suspension services to the same. In this illustrative embodiment, air valves 210 and 212 are both coupled to a frame brace 252 that extends between frame members 254 and 255. Tubing 223 provides air communication between valve 210 and air spring 202. (See, also, FIG. 13.) Similarly, tube 225 provides air communication between valve 212 and air spring 204. Port 256 on each valve 210, 212 connects the same to respective air springs 202, 204. (See FIG. 13.) Valves 214 and 216 are also attached to frame members 254, 255, respectively, as shown in FIG. 10, and are each in air communication with air springs 206 and 208, respectively. Tubes 258 and 260 each provide the fluid communication between valves 214, 216 and corresponding spring 206, 208, respectively. It is appreciated that valves 214, 216 also connect to springs 206, 208, respectively, via perspective ports 256. (See FIG. 13.)

Figure 15:
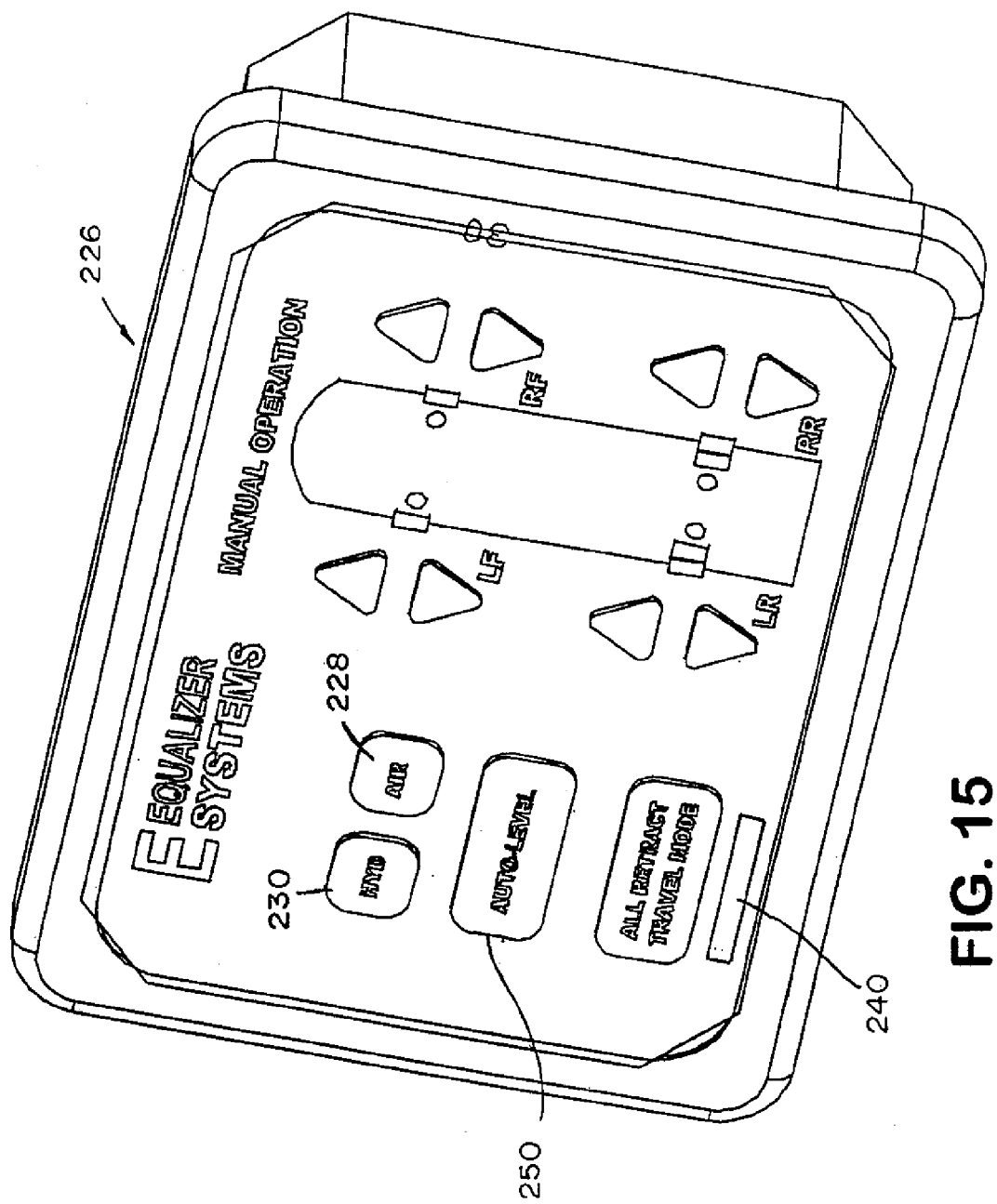
FIG. 15 is a perspective view of an illustrative controller showing an illustrative operator interface.

Control panel 226 is illustratively located in a passenger compartment (not shown) and has an interface, such as that shown in FIG. 15, for controlling apparatus 200. As shown in FIG. 9 herein, control panel 226 is in electronic communication with level sensor 90 and control circuit 100, similar to control box 60. (See, also, FIGS. 4 and 5.) Illustratively, level sensor 90 operates as previously described. Air reservoir 220 is shown with tube 224 extending from port 264. Tube 224 supplies air to valve 210, 212, 214, and 216, via port 266 on each of the respective valves. (See, also, FIG. 13.) This allows air from the reservoir to be distributed to each of the air valves and ultimately into the respective air springs. Auxiliary compressor 222 is shown positioned illustratively adjacent to leg 244 for providing air to reservoir 220 via tube 237. Further shown in FIG. 10 is air supply 232. Supply 232 is a compressor assembly that provides air to springs 202, 204, 206, 208 during the suspension process of the traveling vehicle.

A schematic view of the air suspension leveling apparatus 200 is shown in FIG. 10. During normal operation of vehicle 10, air supply 232 provides air through tubes 234 into ride height sensor/adjustment assemblies 218. Under normal operating conditions, ride height sensor/adjustment assemblies 218, which are, typically, mechanically connected to the vehicle's wheel axles (not shown), monitor the height of the vehicle's chassis relative to the wheel's axles. When one of the sensor assemblies 218 determines that the height of the chassis has decreased from a preset tolerance, sensor 218 will compensate by directing air from supply 232 through tubing 234 and into the appropriate air spring 202, 204, 206, or 208. Conversely, when one of the sensor assemblies 218 detects that the height between the chassis and the wheel axle has increased from a preset tolerance, the sensor assembly 218 opens port 238 in the appropriate valve 210, 212, 214, or 216, releasing air from the corresponding air spring.

Air suspension leveling apparatus 200 compliments the suspension system by also utilizing valves 210, 212, 214, and 216. As shown in FIG. 10, valves 210, 212, 214, 216 are illustratively configured to receive air from both assemblies 218 during travel of the vehicle, and reservoir 220 during the leveling process of the parked vehicle. As shown, tubes 278, 280, and 282 supply air from the assemblies 218 to the respective valve assemblies 210, 212, 214, 216. In an illustrative embodiment, the front of the chassis 284 uses one sensor assembly 218, where the rear chassis 286 uses two assemblies 218. It is appreciated, however, that any number of sensor assemblies 218 can be used. For example, depending on the type of vehicle, as few as one or as many as six ride height sensor assemblies can be used. Valves 210, 212, 214, 216 receive air from tubes 278 through 282, respectively, via port 288. (See FIG. 13.) Accordingly, by adjusting valves 210, 212, 214, or 216, air can be supplied to springs 202, 204, 206, or 208, respectively, for both suspension purposes during travel of the vehicle and leveling purposes while the vehicle is stopped. It is appreciated that when switching between suspension and leveling, the air springs need not completely deflate and then re-inflate to begin the leveling process. Apparatus 200 may simply supplement or expel the air already in the springs, based on the leveling needs. It is appreciated that the air suspension apparatus 200 is controlled by similar means as the prior embodiment that operates legs. (See descriptions related to FIGS. 4 through 8.) The exception is that apparatus 200 does not go through an "unstow" process. Nor does apparatus 200 rely on leg sensor 80. Rather, when initiated, apparatus 200 compares the level information from level sensor 90 to the present level condition stored in memory 120 and performs the leveling routines as previously discussed.

Figure 11:
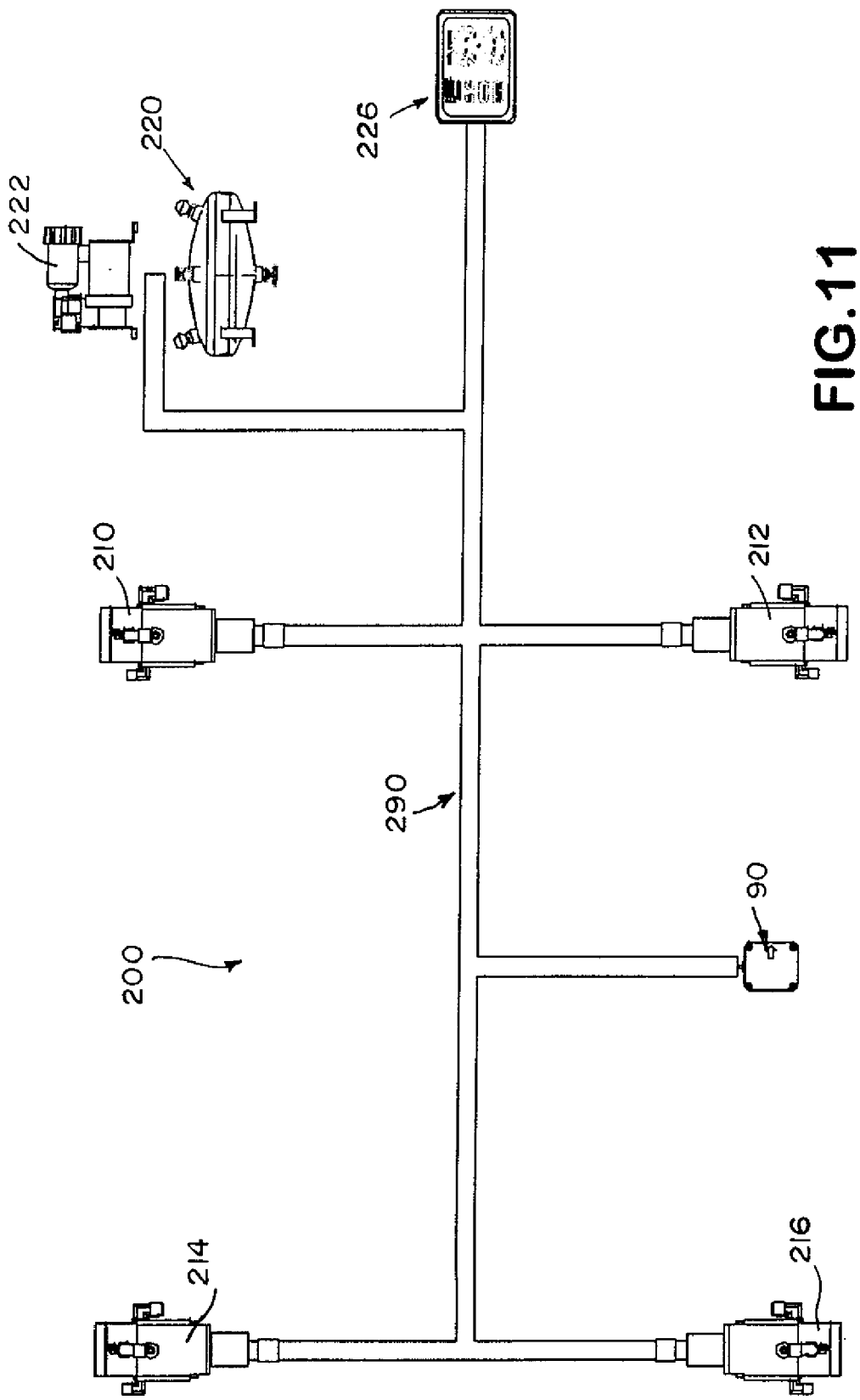
FIG. 11 is a diagrammatic view of an electrical harness portion of the leveling apparatus of FIGS. 9 and 10.

A diagnostic view of electrical harness 290 of apparatus 200 is shown in FIG. 11. This view illustrates how the various components of leveling apparatus 200 communicate electronically to achieve a level condition. This view shows control panel 226, valves 210, 212, 214, 216, and level sensor 90. These individual components communicate via electrical harness 290. In one illustrative embodiment, when vehicle 10 is parked, leveling assembly 200 is initiated by activating the control panel 226. Control panel 226 sends an electrical signal through harness 290 to control valves 210, 212, 214, 216 which disables the pneumatic pathway from the ride height sensor/adjustment assemblies 218 (i.e., "blocking mode"). This cuts off communication between the suspension system and air springs 202, 204, 206, and 208.

As previously discussed, an operator may have the choice to automatically or manually level vehicle 10 through apparatus 200. Where an operator desires to automatically level vehicle 10, activating the appropriate controls on panel 226 initiates software routines similar to that described with respect to the previous embodiment. Illustratively, a controller, such as control circuit 100, determines the condition of the vehicle relative to level by polling level sensor 90. (See FIGS. 5 and 6.) The data received from level sensor 90 is then compared to a preset value stored in memory that represents an illustrative level state. Based on the results of the comparison, apparatus 200 determines the extent to which vehicle 10 is out of level condition. This, accordingly, determines which air spring needs to be inflated or deflated and by what amount. Once this determination is made, the assembly sends a series of signals through harness 290 to the appropriate valves 210, 212, 214, or 216. The signal tells the appropriate valve whether to inflate or deflate the corresponding air spring as previously discussed. Illustratively, in one embodiment, the condition of the vehicle is continuously monitored by the level sensor to determine whether the vehicle is reaching a level condition. Signals may continue to be sent to the appropriate valve or valves until level sensor 90 determines that the vehicle's position matches the level condition $P_R$ within a tolerance. (See, also, FIGS. 7 and 8.)

If the operator desires to manually level the vehicle, this too is accomplished by activating the appropriate controls on panel 226. In this case, however, the operator determines which springs to inflate or deflate, depending on the operator's perceived condition of the vehicle relative to level. Illustratively, if it is determined that one or more of the air springs needs to be inflated, the appropriate control on panel 226 will be activated. An electrical signal will be sent through harness 290 to the appropriate valve which will allow air to pass therethrough and inflate one of the air springs. If, in contrast, the operator desires to lower one of the corners by deflating a corresponding air spring, activating the appropriate controls on control panel 226 will send an electrical signal to the appropriate control valve. This signal then opens exhaust port 238 allowing air from the appropriate air spring to escape, thereby deflating the same.

In another illustrative embodiment, apparatus 200 contemplates that the control circuit 100 may periodically re-poll level sensor 90. This operation can be used to compensate for any air leaks that might exist or develop throughout apparatus 200. If the re-polling indicates a corner of vehicle 10 develops an out of level condition, control circuit 100 will initiate the leveling process as previously described to re-level vehicle 10.

Figure 12:
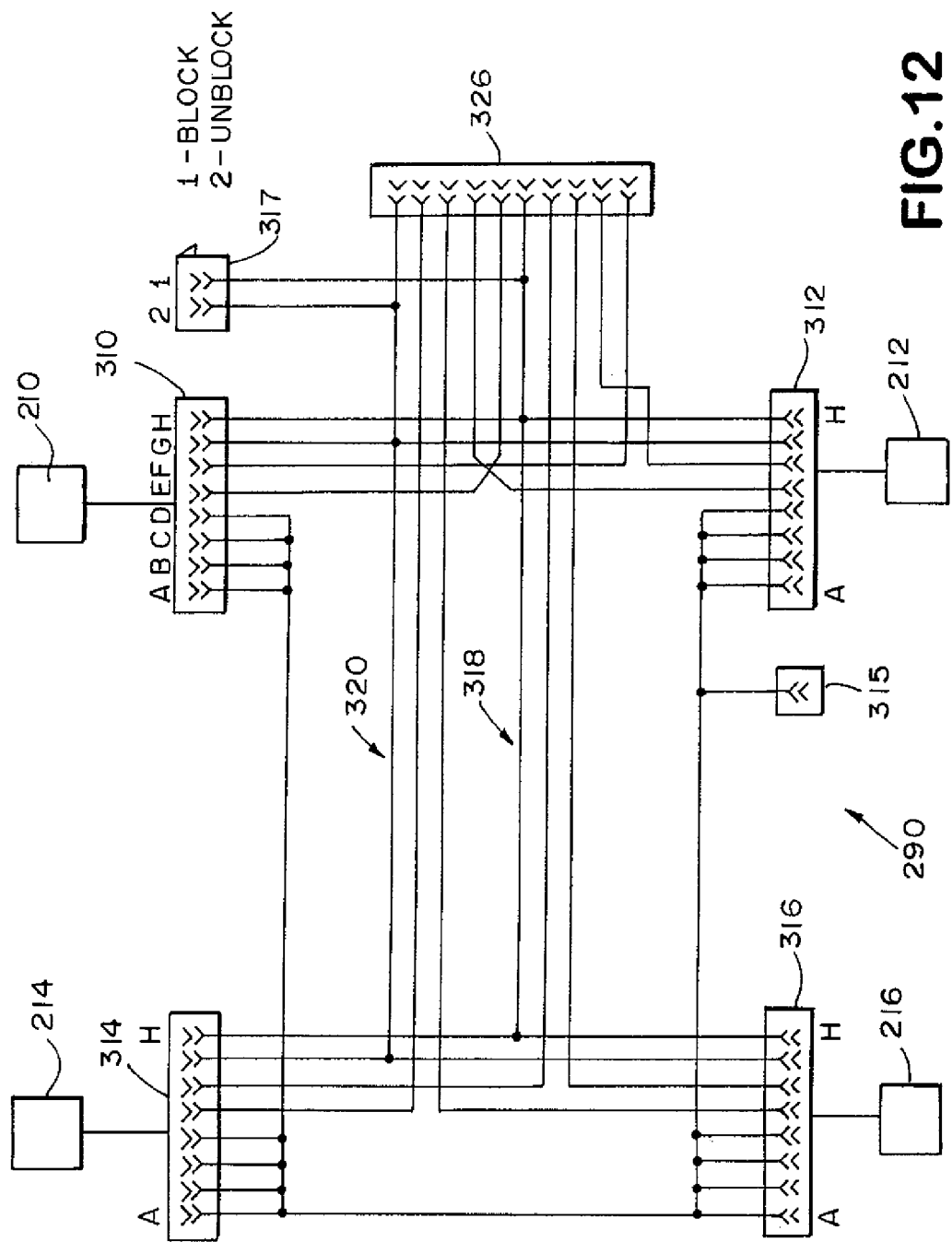
FIG. 12 is a schematic diagram of the electrical system for the fluid leveling apparatus.

A schematic view of electrical harness 290 is shown in FIG. 12. Harness 290 provides the electrical communication between control panel 226 to air valves 210, 212, 214, and 216. Harness 290 is connected to panel 226 through connector 326. As previously discussed, two signals, common to valves 210, 212, 214, 216, are sent through harness 290. The first common signal is the blocking signal that disables the pneumatic pathway from the ride height sensor/adjustment assemblies 218 to air springs 202, 204, 206, 208. This blocking signal is sent from panel 226 through harness 290, along path 318 to valves 210, 212, 214, 216.

Harness 290 communicates with air valves 210, 212, 214, 216 through connectors 310, 312, 314, 316, respectively. For illustrative purposes, the interaction between panel 226 and valve 210 through connector 310 is herein described. It is appreciated, however, that the descriptions related to valve 210 and connection 310 apply to valves 212, 214, 216 and connections 312, 314, 316, respectively, as well. When leveling assembly 200 is activated, illustratively, with button 228 on control panel 226, relay 134 sends a blocking signal through path 318 to connector 310 pin H. This signal blocks the air path between ports 256 and 288 of valve 210. If a control on panel 226 is activated, a signal is sent from relay 130 through harness 290 to connector 310 pin F, which opens the path between ports 266 and 256 of valve 210, allowing air to flow from port 256 into air spring 202. This causes spring 202 to inflate and raise the associated corner of the vehicle. In contrast, if another control on panel 226 is activated, a different signal is sent from relay 130 through harness 290 to connector 310 pin E, which opens the path between ports 238 and 256 of valve 210. This allows air to be exhausted from spring 202, causing it to deflate and lower the associated corner of the vehicle. It is appreciated that during the automatic leveling function, the same signals are sent through the same path, as previously described, with the exception that signals controlling the operation of valves 210, 212, 214, 216 are generated by processor 110.

The second common signal is the "unblock" signal that enables the pneumatic pathway from the ride height sensor/adjustment assemblies 218 to air springs 202, 204, 206, 208. This "unblocking" signal is sent from panel 226 through harness 290 along path 320 out to valves 210, 212, 214, 216. When leveling apparatus 200 is deactivated, illustratively with button 228 (or button 240) on control panel 226, relay 135 sends the "unblock" signal through path 320 to connector 310 and pin G. This opens the air path between ports 256 and 288 on valve 210 and reestablishes the pneumatic pathway from the ride height sensor/adjustment assemblies 218 to air spring 202.

Also shown on connector 310 are pins A, B, C, and D. These pins provide the electrical path to ground 315 required to activate the ports on valve 210. Connector 317 is provided for inflating and deflating any additional air springs that are mounted to the vehicle suspension, but may not be utilized during the leveling process.

Figure 14:
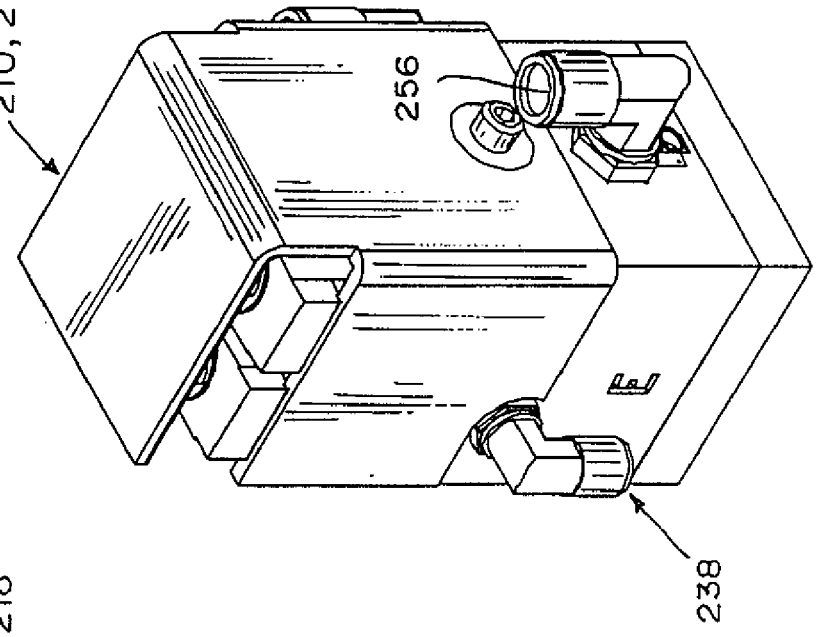
FIG. 14 is another view of the pneumatic valve assembly of FIG. 13.
Figure 13:
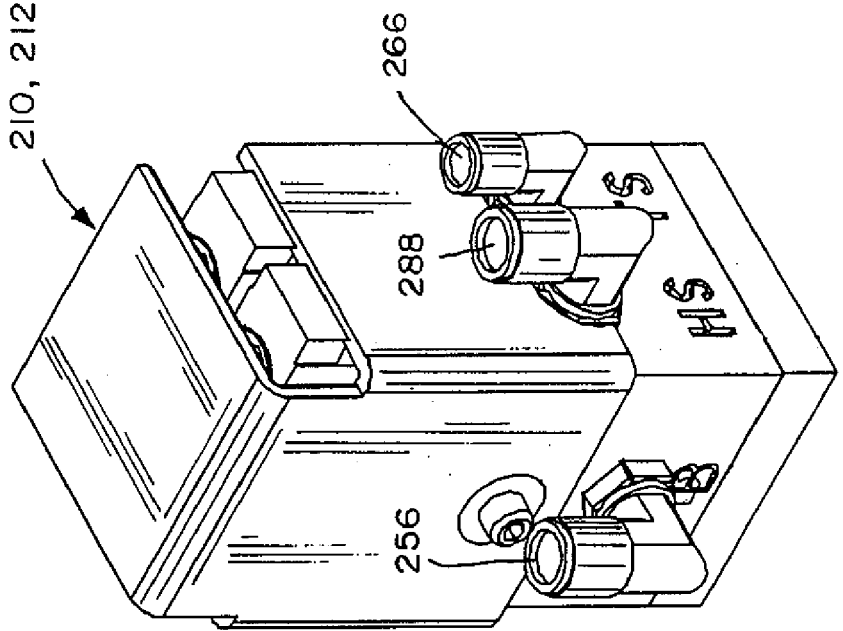
FIG. 13 is a perspective view of a fluid valve assembly.

Opposed perspective views of an illustrative valve assembly are shown in FIGS. 13 and 14. It is appreciated that in these views, the valve assembly shown can be either valve assembly 210, 212, 214, or 216. The valve assembly is configured to distribute air or other vapor fluid to a respective air spring from either one of the height sensor/adjustment assemblies 218, or directly from reservoir 220 or supply 232. The valve assembly also serves as an exhaust for the air springs. Accordingly, when air is to be expelled from the spring, that air will be exhausted out through the valve assembly via port 238. The valve assembly also comprises port 266 that is in air communication with tube 224 that receives air from either air reservoir 220 or supply 232 during the leveling process of the vehicle. (See, also, FIG. 10.) In contrast, port 288 is in air communication with either tube 278, 280, or 284, and assembly 218. During the "blocking" process, the valve assembly switches air access to the spring from port 288 to port 266. Air is then distributed through port 256 and out to one of the air springs 202, 204, 206, or 208. As shown in FIG. 14, air from one of the air springs can travel back through port 256 where that air can be exhausted through port 238.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An apparatus for leveling a vehicle having an air suspension system which comprises an independently adjustable right front suspension assembly, left front suspension assembly, right rear suspension assembly, and left rear suspension assembly mounted to the vehicle, the apparatus for leveling a vehicle comprising, a sensor mounted to the vehicle to sense pitch and roll of the vehicle relative to a reference level plane, the sensor producing an orientation signal representing the vehicle pitch and roll; a controller coupled to the air suspension system and the sensor, wherein the controller, in response to an operator command, levels the vehicle relative to the reference level plane by sequentially actuating the suspension assemblies, wherein the controller interprets the orientation signal to determine an end and a side of the vehicle which are below the reference level plane, then alternating between adjusting the end and the side upwardly by sequentially supplying air to the suspension assemblies at the end and sequentially supplying air to the suspension assemblies at the side, each suspension assembly being inflated for a first predetermined period of time during each upward adjustment, and wherein the controller includes a memory for storing data corresponding to the reference level plane and is configured to write data representing an orientation signal to the memory to replace the reference level plane data with orientation signal data.

2. The apparatus of claim 1, wherein the sensor provides the orientation signal to the controller indicating a change in the vehicle orientation when the vehicle is at rest.

3. The apparatus of claim 1, wherein the controller interprets the orientation signal after each adjustment to determine whether either the end or the side has passed through the reference level plane.

4. The apparatus of claim 3, wherein upon determining that one of the ends or the side has passed through the reference level plane, the controller alternates between adjusting the one end or side downwardly by sequentially deflating the suspension assemblies at the one end or side for a second predetermined period of time which is less than the first predetermined period of time, and continuing to adjust the other end or side upwardly by sequentially inflating the suspension assemblies at the other end or side for the first predetermined period of time.

5. The apparatus of claim 4, wherein the controller changes the direction of adjustment of the end and the side each time the end and the side pass through the reference level plane as indicated by the orientation signal and reduces the period of time for inflating or deflating the suspension assemblies at the end and the side with each passing of the reference level plane.

6. The apparatus of claim 1, further comprising switches for individually actuating the suspension assemblies.

7. The apparatus of claim 1, further comprising a valve assembly that allows deflating and inflating of at least one of the suspension assemblies.

8. The apparatus of claim 7, wherein a valve assembly is provided for each suspension assembly.

9. The apparatus of claim 7, wherein air can be selectively added to or exhausted from at least one of the suspension assemblies through the valve assembly.

10. The apparatus of claim 9, wherein the controller blocks the ability of at least one of the suspension assemblies to provide suspension to the vehicle when the vehicle is at rest.

11. The apparatus of claim 10, wherein the controller initiates the leveling of the vehicle by inflating or deflating at least one of the suspension assemblies after its ability to provide suspension to the vehicle is blocked.

12. The apparatus of claim 7, wherein, during leveling of the vehicle, air can be added to or subtracted from air already present in the suspension assemblies prior to leveling the vehicle.

13. A method for automatically leveling a vehicle having four adjustable air springs mounted to a suspension system on the vehicle at each of the respective corners of the vehicle, each spring being inflatable and deflatable, a sensor mounted to the vehicle to sense the pitch and roll of the vehicle and provide an orientation signal representing the vehicle pitch and roll, and a controller coupled to the springs and the sensor for responding to the vehicle orientation signal by inflating or deflating the springs to adjust the vehicle orientation so it approaches a reference level plane stored as data within the controller, the method comprising the steps of: blocking air suspension control to the springs; comparing the orientation signal produced by the sensor; determining a low end and a low side of the vehicle, relative to the reference level plane; and alternating between sequentially inflating at least one of the springs at the low end of the vehicle for a first predetermined actuation period, and sequentially inflating at least one of the springs at the low side of the vehicle for a second predetermined actuation period which is the same as the first predetermined actuation period, determining whether the low end of the vehicle has been moved through the reference level plane after each sequential inflation of the springs at the low end of the vehicle, reversing direction of adjustment of the springs at the low end of the vehicle each time the low end of the vehicle is moved through the reference level plane, reducing the first predetermined actuation period each time the direction of adjustment of the springs at the low end of the vehicle is reversed, determining whether the low side of the vehicle has been moved through the reference level plane after each sequential inflation of the springs at the low side of the vehicle, reversing the direction of adjustment of the springs at the low side of the vehicle each time the low side of the vehicle is moved through the reference level plane, reducing the second predetermined actuation period each time the direction of adjustment of the springs at the low side of the vehicle is reversed, comparing the first and second predetermined actuation period to a preset minimum actuation period and stopping the automatic leveling process when either the first or the second predetermined actuation period is less than the preset minimum actuation period.

14. The method of claim 13, further comprising the step of further inflating each spring until it lifts its respective corner of the vehicle sufficiently that the orientation signal indicates a change in vehicle orientation.

15. The method of claim 13, further comprising the step of stopping the automatic leveling when the orientation signal represents a vehicle orientation which is within a specified tolerance of the reference level plane.

16. An apparatus for automatically leveling a vehicle having four corners, the apparatus comprising: an adjustable air spring mounted to the vehicle adjacent the left front corner of the vehicle; an adjustable air spring mounted to the vehicle adjacent the right front corner of the vehicle; an adjustable air spring mounted to the vehicle adjacent the left rear corner of the vehicle; an adjustable air spring mounted to the vehicle adjacent the right rear corner of the vehicle; a level sensor mounted to the vehicle for sensing the pitch and roll orientation of the vehicle relative to horizontal, the level sensor outputting an orientation signal representing the pitch and roll of the vehicle; a controller connected to the adjustable air springs and the level sensor, the controller including a memory for storing data representing a reference level plane and outputs coupled to the adjustable air springs for inflating and deflating the air springs, the controller comparing the orientation signal to the reference level plane to determine whether the front or rear of the vehicle is above the reference level plane and whether the left or right side of the vehicle is below the reference level plane, the controller being responsive to an operator input to level the vehicle by alternating between sequential adjustments of the air springs at the front or rear of the vehicle which is above the reference level plane and sequentially deflating at least one of the air springs at the left or right side of the vehicle which is above the reference level plane; wherein the controller actuates each air spring for a first predetermined period of time during each adjustment until the orientation signal indicates that the front, rear, left side, or right side of the vehicle has passed through the reference level plane and wherein the controller inflates the air springs corresponding to the front, rear, left side, or right side of the vehicle which has passed through the reference level plane for a second predetermined period of time which is less than the first predetermined period of time.

* * * * *